United States Patent
Ohki et al.

(10) Patent No.: US 9,704,218 B2
(45) Date of Patent: Jul. 11, 2017

(54) IMAGE PROCESSING DEVICE AND METHOD, AND PROGRAM

(71) Applicant: Sony Corporation, Tokyo (JP)

(72) Inventors: Mitsuharu Ohki, Tokyo (JP); Hideshi Yamada, Kanagawa (JP); Kenichi Sano, Tokyo (JP); Naoya Katoh, Chiba (JP); Atsushi Kimura, Tokyo (JP); Tomonori Masuno, Tokyo (JP)

(73) Assignee: Sony Corporation, Tokyo (JP)

( * ) Notice: Subject to any disclaimer, the term of this patent is extended or adjusted under 35 U.S.C. 154(b) by 198 days.

(21) Appl. No.: 14/354,968

(22) PCT Filed: Nov. 2, 2012

(86) PCT No.: PCT/JP2012/078424
§ 371 (c)(1),
(2) Date: Apr. 29, 2014

(87) PCT Pub. No.: WO2013/069554
PCT Pub. Date: May 16, 2013

(65) Prior Publication Data
US 2014/0313224 A1    Oct. 23, 2014

(30) Foreign Application Priority Data
Nov. 9, 2011  (JP) ................................ 2011-245294

(51) Int. Cl.
*G06T 3/40* (2006.01)
*H04N 5/232* (2006.01)

(52) U.S. Cl.
CPC ........ *G06T 3/4038* (2013.01); *H04N 5/23238* (2013.01)

(58) Field of Classification Search
None
See application file for complete search history.

(56) References Cited

U.S. PATENT DOCUMENTS

| 2006/0115181 A1* | 6/2006 | Deng | G06T 3/0075 |
| | | | 382/284 |
| 2011/0096143 A1 | 4/2011 | Ono | |
| 2011/0141227 A1* | 6/2011 | Bigioi | G06T 7/0075 |
| | | | 348/36 |

FOREIGN PATENT DOCUMENTS

| JP | 2004-088678 A | 3/2004 |
| JP | 2008-003683 A | 1/2008 |
| JP | 2011-097246 A | 5/2011 |

OTHER PUBLICATIONS

Zhu et al. "Fast construction of dynamic and multi-resolution 360o panoramas from video sequences", Image and Vision Computing 24 (2006) p. 13-26.*

* cited by examiner

*Primary Examiner* — Yingchun He
(74) *Attorney, Agent, or Firm* — Chip Law Group

(57) ABSTRACT

The present technique relates to an image processing device, an image processing method, and a program for obtaining a high-quality panoramic image when a 360-degree panoramic image is generated.
A projected image generation unit generates projected images by mapping, on a cylindrical surface, captured images taken by a camera being rotated 360 degrees. A cumulative difference value calculation unit calculates a cumulative difference value in each position between the adjacent projected images. Based on the projected images and the cumulative difference values, a diagraph generation unit generates a diagraph reflecting the cumulative difference values in the energies of edges. Based on the diagraph, the path search unit searches for such projected image joining positions as to minimize defects when a panoramic image is generated by joining the respective projected images. A panoramic image generation unit joins the projected images based on a result of the search, and generates a panoramic image. The present technique can be applied to image processing devices.

8 Claims, 38 Drawing Sheets

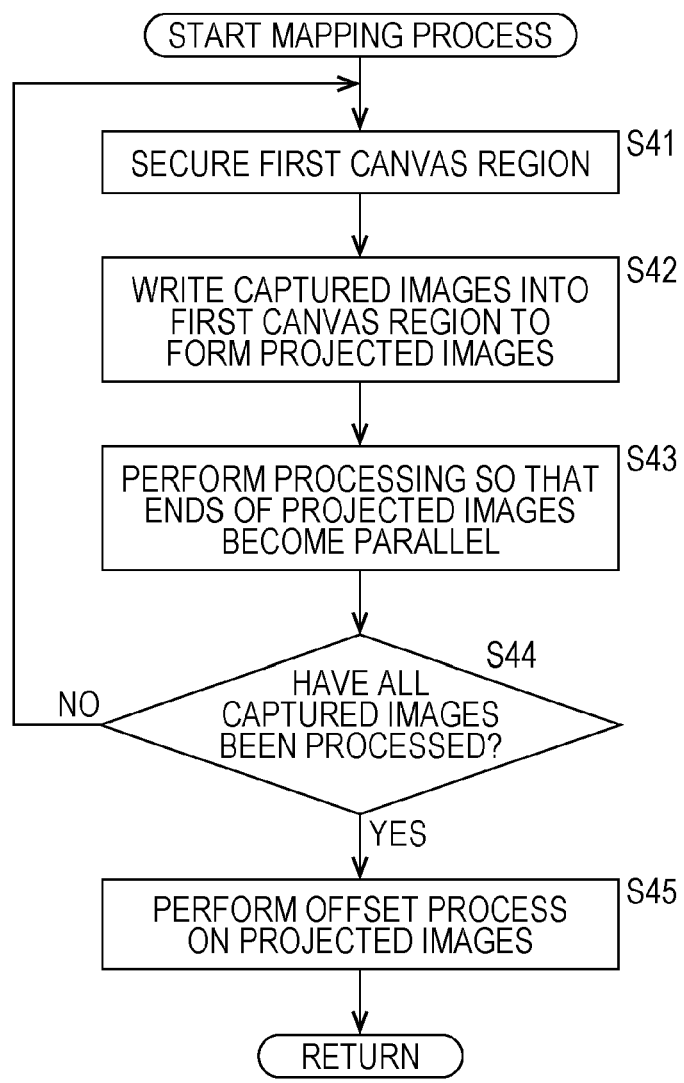

FIG. 25

```
//pseudo code start width=2 × π × F;
height="NUMBER OF PIXELS IN CAPTURED IMAGE IN VERTICAL DIRECTION" × 0.9;

for (s=1;s<=N;s+=1) {
    SECURE FIRST CANVAS REGION OF "width" AND "height" IN SIZE FOR sTH CAPTURED IMAGE.
    for (Cx=0;Cx<width;Cx+=1) {
        for (Cy=-height/2;Cy<=height/2;Cy+=1) {
            DETERMINE Xs AND Ys TO SATISFY EXPRESSION (3).
            if (POSITION (Xs, Ys) IN sTH CAPTURED IMAGE IS VALID PIXEL POSITION.) {
                WRITE PIXEL VALUE OF POSITION (Xs, Ys) IN sTH CAPTURED IMAGE
                    INTO POSITION (Cx, Cy) IN FIRST CANVAS REGION FOR sTH CAPTURED IMAGE.            ⎫
            }                                                                                          ⎬ FC11
        }                                                                                              ⎭
    }
    validFlag=1;
    for (Cy=-height/2;Cy<=height/2;Cy+=1) {
        if (THERE IS NO DATA WRITTEN IN POSITION (Cx, Cy) IN FIRST CANVAS REGION FOR sTH CAPTURED IMAGE.) {
            validFlag=0;
        }
    }
    if (validFlag=0) {
        for (Cy=-height/2;Cy<=height/2;Cy+=1) {                                                        ⎫
            INVALIDATE DATA IN POSITION (Cx, Cy) IN FIRST CANVAS REGION FOR sTH CAPTURED IMAGE.        ⎬ FC12
        }                                                                                              ⎭
    }
}
//TO FIG. 26
```

FIG. 26

```
//CONTINUED FROM FIG. 25

//HEREAFTER, OFFSET PROCESS IS PERFORMED SO THAT LEFT END OF FIRST CAPTURED IMAGE IS LOCATED AT 0 IN COORDINATE SYSTEM.

//FIRST, DETERMINE OFFSET VALUE, OR CALCULATE DISTANCE FROM ORIGIN TO LEFT END.
Cx=width-1;
while () {
    if (THERE IS NO DATA WRITTEN IN POSITION Cx IN FIRST CANVAS REGION FOR FIRST CAPTURED IMAGE.) {
        offsetCx=width-Cx-1;
        break;
    }
    Cx=Cx-1;
}

//FORM IMAGE BY SHIFTING PIXEL DATA OF EACH "FIRST CANVAS REGION" BY OFFSET AMOUNT.
for (s=1;s<=N;s+=1) {
    SECURE "SECOND CANVAS REGION" OF "width" AND "height" IN SIZE FOR sTH CAPTURED IMAGE.
    for (Cx=0;Cx<width;Cx+=1) {
        tmpCx= (Cx-offsetCx) mod (width) ;
        for (Cy=-height/2;Cy<=height/2;Cy+=1) {
            WRITE PIXEL VALUE OF POSITION (tmpCx, Cy) IN FIRST CANVAS REGION FOR sTH CAPTURED IMAGE
                INTO POSITION (Cx, Cy) IN SECOND CANVAS REGION FOR sTH CAPTURED IMAGE.
        }
    }
    STORE IMAGE DATA OF SECOND CANVAS REGION FOR sTH CAPTURED IMAGE
        AS "sTH PROJECTED IMAGE ON CYLINDRICAL SURFACE", WHERE s=1 TO N.
}

//pseudo code end
```

FIG. 29

```
//pseudo code start width=2 × π × F;
height="NUMBER OF PIXELS IN CAPTURED IMAGE IN VERTICAL DIRECTION" × 0.9;

for (s=1;s<=N-1;s+=1) {
    for (Cx=0;Cx<width;Cx+=1) {
        if (
            (THERE IS DATA WRITTEN IN POSITION Cx IN "sTH PROJECTED IMAGE ON CYLINDRICAL SURFACE".)
            &
            (THERE IS DATA WRITTEN IN POSITION Cx IN "(s+1)TH PROJECTED IMAGE ON CYLINDRICAL SURFACE".)
        ) {
            Diff [s, s+1] (Cx) =0;
            for (Cy=-height/2;Cy<=height/2;Cy+=1) {
                ACCUMULATE DIFFERENCES Diff [s, s+1] (Cx) BETWEEN PIXEL VALUE IN POSITION (Cx, Cy)
                IN "sTH PROJECTED IMAGE ON CYLINDRICAL SURFACE" AND PIXEL VALUE IN
                POSITION (Cx, Cy) IN "(s+1)TH PROJECTED IMAGE ON CYLINDRICAL SURFACE".
            }
        } else {
            MAKE Diff [s, s+1] (Cx) INVALID DATA.
        }
    }
}

```
//CONTINUED FROM FIG. 29 for (Cx=0;Cx<width;Cx+=1) {
    if (
        (THERE IS DATA WRITTEN IN POSITION Cx IN "NTH PROJECTED IMAGE ON CYLINDRICAL SURFACE".)
        &
        (THERE IS DATA WRITTEN IN POSITION Cx IN "FIRST PROJECTED IMAGE ON CYLINDRICAL SURFACE".)
    ){
        Diff [N, N+1] (Cx) =0;
        for (Cy=-height/2;Cy<=height/2;Cy+=1) {
            ACCUMULATE DIFFERENCES Diff [N, N+1] (Cx) BETWEEN PIXEL VALUE IN POSITION (Cx, Cy)
            IN "NTH PROJECTED IMAGE ON CYLINDRICAL SURFACE" AND PIXEL VALUE IN
            POSITION (Cx, Cy) IN "FIRST PROJECTED IMAGE ON CYLINDRICAL SURFACE".
        }
    } else {
        MAKE Diff [N, N+1] (Cx) INVALID DATA.
    }
}
//pseudo code end
```

FIG. 31

```
//pseudo code start
width=2 × π × F;

for (s=1;s<=N;s+=1) {//HEREAFTER, 0 IS SET AS ENERGY FOR RIGHTWARD EDGES (s=1 TO N).
    for (Cx=0;Cx<width-1;Cx+=1) {
        if (
            (THERE IS DATA WRITTEN IN POSITION Cx IN "sTH PROJECTED IMAGE ON CYLINDRICAL SURFACE".)
            &
            (THERE IS DATA WRITTEN IN POSITION Cx+1 IN "sTH PROJECTED IMAGE ON CYLINDRICAL SURFACE".)
        ){
            edge [(Cx, s), (Cx+1, s)] =0;
                //SET 0 AS ENERGY VALUE FOR EDGE FROM (Cx, s) TO (Cx+1, s).
        }
    }
    if (
        (THERE IS DATA WRITTEN IN POSITION Cx=width-1 IN "sTH PROJECTED IMAGE ON CYLINDRICAL SURFACE".)
        &
        (THERE IS DATA WRITTEN IN POSITION Cx=0 IN "sTH PROJECTED IMAGE ON CYLINDRICAL SURFACE".)
    ){
        edge [(width-1, s), (0, s)] =0;
            //SET 0 AS ENERGY VALUE FOR EDGE FROM (width-1, s) TO (0, s).
    }
}
//TO FIG. 32
```

FIG. 32

```
//CONTINUED FROM FIG. 31

//HEREAFTER, 0 IS SET AS ENERGY FOR RIGHTWARD EDGE (s = N+1).
for (Cx=0;Cx<width-1;Cx+=1) {
    if (
        (THERE IS DATA WRITTEN IN POSITION Cx IN "FIRST PROJECTED IMAGE ON CYLINDRICAL SURFACE".)
        &
        (THERE IS DATA WRITTEN IN POSITION Cx+1 IN "FIRST PROJECTED IMAGE ON CYLINDRICAL SURFACE".)
    ) {
        edge [ (Cx, N+1), (Cx+1, N+1) ] =0;
            //SET 0 AS ENERGY VALUE FOR EDGE FROM (Cx, N+1) TO (Cx+1, N+1).
    }
}

```
//CONTINUED FROM FIG. 32

//SET ENERGIES FOR EDGES (s=1 TO N) EXTENDING DOWNWARD TO RIGHT FROM s TO s+1.
for (s=1;s<=N;s+=1) {
    for (Cx=0;Cx<width-1;Cx+=1) {
        if (
            (THERE IS VALID DATA WRITTEN IN Diff [s, s+1](Cx).)
            &
            (THERE IS VALID DATA WRITTEN IN Diff [s, s+1](Cx+1).)
        ) {
            edge [ (Cx, s), (Cx+1, s+1) ] = (Diff [s, s+1] (Cx) +Diff [s, s+1] (Cx+1) ) /2;
                        //SET ENERGY VALUE FOR EDGE FROM (Cx, s) TO (Cx+1, s+1).
        }
    }
    if (
        (THERE IS VALID DATA WRITTEN IN Diff [s, s+1] (width-1).)
        &
        (THERE IS VALID DATA WRITTEN IN Diff [s, s+1] (0).)
    ) {
        edge [ (width-1, s), (0, s+1) ] = (Diff [s, s+1] (width-1) +Diff [s, s+1] (0) ) /2;
                        //SET ENERGY VALUE FOR EDGE FROM (width-1, s) TO (0, s+1).
    }
}
//pseudo code end
```

FIG. 34

```
//pseudo code start width=2 × π × F;

minTotal=HUGE_VALUE;//SET LARGEST POSSIBLE VALUE IN SYSTEM AS INITIAL VALUE.

for (Cx=0;Cx<width-1;Cx+=1) {
    if (THERE IS DATA DETERMINED FOR edge [ (Cx, 1), (Cx+1, 1) ]
                                  AND/OR edge [ (Cx, 1), (Cx+1, 2) ] ) {

CALCULATE PATH WITH SMALLEST TOTAL ENERGY VALUE AMONG PATHS EXTENDING
        FROM (Cx, 1) TO (Cx, N+1) BY DYNAMIC PROGRAMMING IN GENERATED DIAGRAPH.
        SMALLEST PATH IS path (Cx), AND TOTAL ENERGY VALUE IS total (Cx).

if (total (Cx) <minTotal) {
            minTotal=total (Cx);
            minPath=path (Cx);
        }
    }
}

OUTPUT PATH INFORMATION ABOUT "minPath".

//pseudo code end
```

FIG. 35

```
//pseudo code start width=2 × π × F;
height="NUMBER OF PIXELS IN CAPTURED IMAGE IN VERTICAL DIRECTION" × 0.9;

SECURE PANORAMIC CANVAS REGION OF "width" AND "height" IN SIZE FOR 360-DEGREE PANORAMIC IMAGE AS EVENTUAL OUTPUT IMAGE.

for (Cx=0;Cx<width;Cx+=1) {

DETERMINE "appropriateS", WHICH IS "s" WITH WHICH CALCULATED PATH EXTENDS THROUGH NODE (Cx, s) IN DIAGRAPH.
    //THERE IS ONLY ONE SUCH "s", AND THERE IS NO OTHER "s".

for (Cy=-height/2;Cy<=height/2;Cy+=1) {
        WRITE PIXEL VALUE IN POSITION (Cx, Cy) IN "(appropriateS)TH PROJECTED IMAGE ON
                                        CYLINDRICAL SURFACE" INTO POSITION (Cx, Cy) IN 360-DEGREE PANORAMIC CANVAS REGION.
    }
}

OUTPUT IMAGE DATA OF "360-DEGREE PANORAMIC CANVAS REGION".

//pseudo code end
```

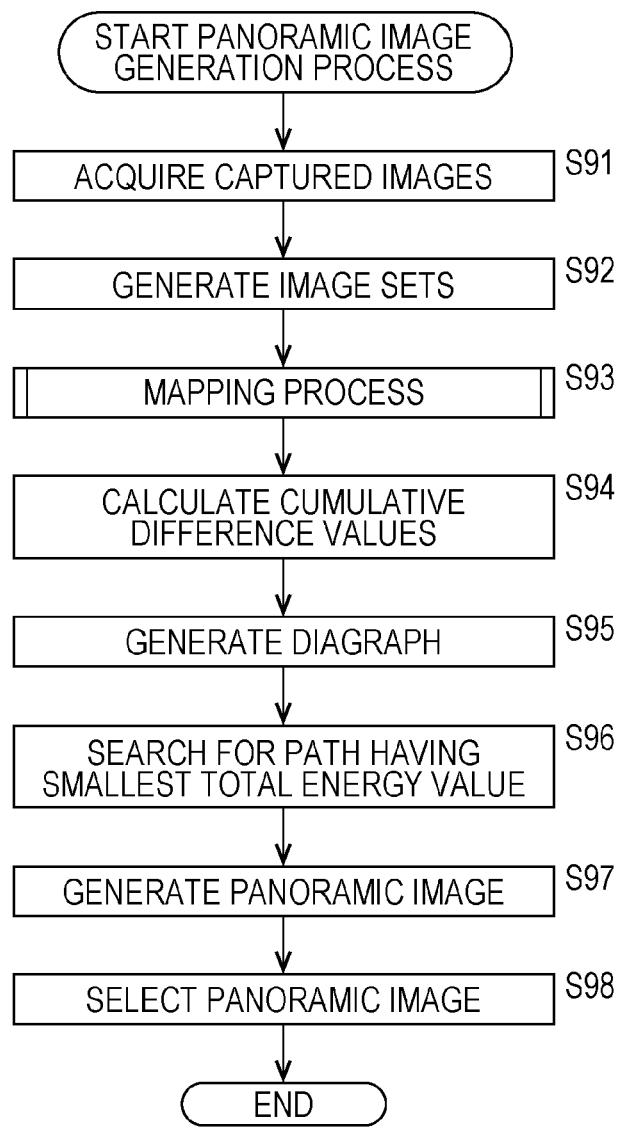

FIG. 38

```
//pseudo code start
//HOMOGENEOUS TRANSFORMATION MATRIX H_{1,s} INDICATING POSITIONAL RELATIONSHIP BETWEEN EACH CAPTURED IMAGE
//(sTH CAPTURED IMAGE) AND FIRST CAPTURED IMAGE IS DETERMINED PRIOR TO THIS ROUTINE. s=1 TO Mmax. H_{1,1} IS IDENTITY MATRIX.

for (t=1;t<=Mmax;t+=1) {
    for (s=1;s<=Mmax;s+=1) {
        PERFORM CALCULATION IN EXPRESSION (11) TO DETERMINE POSITIONAL RELATIONSHIP H_{t,s} OF sTH CAPTURED IMAGE
        BASED ON tTH CAPTURED IMAGE
    }
    NoMoreSetFlag =1;
    for (s=t+1;s<=Mmax-1;s+=1) {
        if (EXPRESSION (12) IS SATISFIED.) {M(t) =s;NoMoreSetFlag=0;break;}
    }
    if (NoMoreSetFlag=1) {Tmax=t-1;break;} // NOTE 1
}

"IMAGE SET OF 1 ROUND" IS Tmax SETS: "FIRST THROUGH M(1)TH CAPTURED IMAGES", "SECOND THROUGH M(2)TH CAPTURED
IMAGES", "THIRD THROUGH M(3)TH CAPTURED IMAGES" , ..., AND "(Tmax)TH THROUGH M(Tmax)TH CAPTURED IMAGES"
//pseudo code end
//NOTE 1: WHEN THIS PROCESS IS STARTED, NO VALUES OF "s" SATISFY EXPRESSION (12),
//OR THERE IS NO CAPTURED IMAGE DATA OF 1 ROUND STARTING FROM tTH CAPTURED IMAGE
```

IMAGE PROCESSING DEVICE AND METHOD, AND PROGRAM

TECHNICAL FIELD

The present technique relates to an image processing device and an image processing method, and a program, and more particularly, to an image processing device, an image processing method, and a program for obtaining a panoramic image with higher quality when a 360-degree panoramic image is generated.

BACKGROUND ART

For example, a 360-degree panoramic image can be generated from 10 images that are successively captured while a digital camera is rotated approximately 36 degrees at a time. That is, a region equivalent to a 36-degree view is cut out from each of the captured images, and the cut-out images are joined together to generate a 360-degree panoramic image.

Specifically, such a panoramic image is generated as described below.

First, positional relationships between adjacent captured images are determined by analyzing the captured images adjacent to one another. The positional relationships are accumulated to determine the direction in which each of the captured images is taken (hereinafter also referred to as the image capturing direction) in a coordinate system based on the first captured image.

The image capturing direction of each captured image in such a coordinate system based on the first captured image, or the positional relationship with respect to each of the captured images in the coordinate system based on the first captured image, can be normally expressed by a 3-by-3 matrix, and is called a homogeneous transformation matrix (homography).

Where the homogeneous transformation matrix expressing the positional relationship with respect to the sth captured image in the coordinate system based on the first captured image is represented by $H_{1,s}$, a relationship according to the following expression (1) is established.

[Mathematical Formula 1]

$$\begin{bmatrix} X_1 \\ Y_1 \\ F \end{bmatrix} \propto H_{1,s} \begin{bmatrix} X_s \\ Y_s \\ F \end{bmatrix} \qquad (1)$$

In the expression (1), F represents the focal length of the lens at the time of capturing an image.

The expression (1) means that an object reflected by the pixel at a location $(X_s, Y_s)$ in the sth captured image is also reflected by the pixel at a location $(X_1, Y_1)$ in the first captured image. The homogeneous transformation matrix $H_{1,s}$ where s=1 is the identity matrix. Since a method of determining a homogeneous transformation matrix through an image analysis is a known method, the method is not specifically described herein.

A cylindrical surface shown in FIG. 1 is now assumed to be in the coordinate system based on the first captured image. In FIG. 1, an $X_1$-axis, a $Y_1$-axis, and a $Z_1$-axis that are perpendicular to one another are the axes of the $X_1$-$Y_1$-$Z_1$ coordinate system based on the first captured image, and CL11 represents the cylindrical surface.

The cylindrical surface CL11 is the side surface of a cylinder that has the $Y_1$-axis as the central axis and has a radius F. Here, the point where the cylindrical surface CL11 intersects the $Z_1$-axis is the origin, and a position in a Cx-Cy coordinate system that has a Cy-axis parallel to the $Y_1$-axis and a Cx-axis extending along the cylindrical surface CL11 in the $X_1$-$Z_1$ plane is represented by (Cx, Cy). That is, the length of an arc AR11 in FIG. 1 is represented by Cx, and the length of a straight line SL11 is represented by Cy. More specifically, in the drawing, the downward direction is the positive direction of the Cy-axis.

As can be seen from FIG. 1, in the $X_1$-$Y_1$-$Z_1$ coordinate system, the direction from the origin O of the $X_1$-$Y_1$-$Z_1$ coordinate system toward a point (Cx, Cy) is equal to the $(X_1, Y_1, Z_1)$ direction that satisfies the following expression (2).

[Mathematical Formula 2]

$$\begin{bmatrix} X_1 \\ Y_1 \\ Z_1 \end{bmatrix} \propto \begin{bmatrix} F \times \sin(Cx) \\ Cy \\ F \times \cos(Cx) \end{bmatrix} \qquad (2)$$

The expression (1) and the expression (2) also prove the following. The pixel value of the pixel in a position $(X_s, Y_s)$ in the sth (1≤s≤10) captured image is mapped (copied) in the position (Cx, Cy) that satisfies the following expression (3) on the cylindrical surface CL11. As the pixel values of respective positions (Cx, Cy) on the cylindrical surface CL11 are determined in this manner, a 360-degree panoramic image can be formed on the cylindrical surface CL11.

[Mathematical Formula 3]

$$\begin{bmatrix} F \times \sin(Cx) \\ Cy \\ F \times \cos(Cx) \end{bmatrix} \propto H_{1,s} \begin{bmatrix} X_s \\ Y_s \\ F \end{bmatrix} \qquad (3)$$

Referring now to FIGS. 2 through 5, the process of forming a panoramic image by mapping respective captured images on the cylindrical surface CL11 is again described.

FIGS. 2 through 5 show projected images placed in a two-dimensional plane in which the cylindrical surface CL11 is developed, or images obtained by mapping captured images. In the drawings, the horizontal direction is the Cx-axis direction.

In FIG. 2, the length (angle) in the horizontal direction of the two-dimensional plane in which the cylindrical surface CL11 is developed is 0 to 360 degrees, and the angle is equivalent to the Cx-coordinate in the Cx-Cy coordinate system.

In FIG. 2, images P1 through P10 are images obtained by mapping first through tenth captured images on the cylindrical surface CL11 according to the above expression (3) where s is 1 through 10, respectively. For example, the image P1 is the image obtained by mapping the first captured image on the cylindrical surface CL11 through a calculation in which the variable s in the expression (3) is 1.

The shaded regions in the images P1 through P10 are the regions in which the pixels of the first through tenth captured images are mapped, or the regions of projected images. The unshaded regions in the images P1 through P10 are the image in which the pixels of the first through tenth captured images are not mapped, as those regions are outside the image capturing range.

For example, the cylindrical surface CL11 is defined based on the first captured image, and therefore, the center position of the image projected on the image P1 is the position at 0 degree.

As the pixel values of the pixels in the regions of the images projected on the images P1 through P10 have been determined, a 360-degree panoramic image is obtained by combining the image data of those 10 images.

For ease of explanation, an offset is applied to the Cx coordinate system so that the left end of the shaded region in the image P1 in FIG. 2 or the left end of the projected image comes to the position of Cx=0. As a result, the images shown in FIG. 3 are obtained.

In the images P1 through P10 shown in FIG. 3, the shaded regions of the projected images are moved by the amount equivalent to the applied offset.

Here, as a coordinate unit, Cx of one round of the cylindrical surface CL11 is assumed to be 36. Cx is closely related to the pixel pitch in the horizontal direction of the 360-degree panoramic image to be eventually obtained.

As one round of the cylindrical surface CL11 is 36, the horizontal (a Cx-axis direction) length of the eventual 360-degree panoramic image is equivalent to 36 pixels. Normally, the horizontal length of an eventual 360-degree panoramic image is equivalent to several thousands of pixels. However, a number as small as 36 is used herein, for ease of explanation.

In a case where the Cx-coordinate unit is defined as above, the horizontal direction of the two-dimensional plane in which the respective images P1 through P10 shown in FIG. 3 are placed is expressed by using the Cx coordinate system, instead of angle. As a result, the images shown in FIG. 4 are obtained.

In FIG. 4, the shaded regions in the respective images P1 through P10 also represent the regions of projected images.

In FIG. 4, a 360-degree panoramic image can be obtained by partially joining the regions of the projected images in the respective images P1 through P10.

Specifically, a 360-degree panoramic image can be obtained by joining regions TR1 through TR10 of the regions of the projected images in the images P1 through P10 as shown in FIG. 5, for example.

In the example shown in FIG. 5, the region TR1 is the region from 10 to 14 in the Cx-coordinate in the image P1. The region TR2 is the region from 15 to 18 in the Cx-coordinate in the image P2. The region TR3 is the region from 19 to 21 in the Cx-coordinate in the image P3. The region TR4 is the region from 22 to 26 in the Cx-coordinate in the image P4.

The region TR5 is the region from 27 to 29 in the Cx-coordinate in the image P5. The region TR6 is the region from 30 to 31 in the Cx-coordinate in the image P6. The region TR7 is the region from 32 to 34 in the Cx-coordinate in the image P7.

Further, the region TR8 is the region at 35 in the Cx-coordinate and the region from 0 to 3 in the Cx-coordinate in the image P8. The region TR9 is the region from 4 to 5 in the Cx-coordinate in the image P9. The region TR10 is the region from 6 to 9 in the Cx-coordinate in the image P10.

As described above, a 360-degree panoramic image is obtained by joining the regions TR1 through TR10.

As a technique related to panoramic images, there is a suggested technique for preventing division of an image of a moving object at an end of a region that is cut out from a captured image when a panoramic image is generated by joining cut-out regions of respective captured images (see Patent Document 1, for example). By using this technique, image defects such as displaying of a divided part of a moving object in a panoramic image can be prevented. Accordingly, high-quality panoramic images can be obtained.

CITATION LIST

Patent Document

Patent Document 1: Japanese Patent Application Laid-Open No. 2011-97246

SUMMARY OF THE INVENTION

Problems to be Solved by the Invention

There are cases where a moving object is shown in captured images when a 360-degree panoramic image is generated as described above.

In the example shown in FIG. 5, for example, the respective captured images are the first through tenth captured images that are successively captured. In other words, there are no two images captured at the same time among those captured images, since those images are captured by one camera. Therefore, in a case where an image of a moving object is captured, there is a possibility that one captured image does not show the moving object while another captured image shows the moving object.

For example, as shown in FIG. 6, in the image P1 corresponding to the first captured image, an image of a moving object MB11 is projected on the region from 13 to 16 in the Cx-coordinate. In FIG. 6, the portions equivalent to those shown in FIG. 5 are denoted by the same reference numerals as those used in FIG. 5, and explanation of them is not repeated herein.

This moving object MB11 has moved when the second captured image is taken. For example, in the image P2 corresponding to the second captured image, an image of the moving object MB11 is projected on the region from 10 to 13 in the Cx-coordinate.

Further, in the image P1 corresponding to the first captured image, an image of another moving object MB12 is projected on the region from 8 to 10 in Cx-coordinate. This moving object MB12 has moved when the tenth captured image is taken, and an image of the moving object MB12 is projected on the region from 12 to 14 in the Cx-coordinate in the image P10 corresponding to the tenth captured image.

If the regions TR1 through TR10 in the respective images P1 through P10 are used in generating a 360-degree panoramic image, the moving object MB11 and the moving object MB12 become divided images in the eventually obtained panoramic image.

Specifically, in generating a panoramic image, the region TR1 in the image P1 corresponding to the first captured image is used. While this region TR1 shows only part of the moving object MB11, the region TR2 to be joined to the region TR1 at the time of generation of the panoramic image does not show the moving object MB11. Therefore, the eventually obtained panoramic image shows only part of the moving object MB11.

Likewise, an image of the moving object MB12 is only partially projected on the region TR1, and is not projected on the region TR10 to be joined to the region TR1 at the time of generation of the panoramic image. Therefore, the eventually obtained panoramic image shows only part of the moving object MB12.

As described above, an image of a moving object is divided depending on movement of the moving object whose image is projected in respective captured images, and the eventually obtained panoramic image unnaturally shows only part of the moving object. In view of this, there is a demand for a technique for preventing division of an image of a moving object when a 360-degree panoramic image is generated.

The technique disclosed in Patent Document 1 can prevent division of an image of a moving object to a certain degree, but cannot cope with a 360-degree panoramic image. Specifically, the technique disclosed in Patent Document 1 cannot join the first captured image and the last captured image without causing division of an image of a moving object.

The present technique has been developed in view of those circumstances, and aims to obtain a panoramic image with higher quality when a 360-degree panoramic image is generated.

Solutions to Problems

An image processing device of one aspect of the present technique is an image processing device that generates a 360-degree panoramic image by joining captured images that are successively taken by an imaging device being rotated. The image processing device includes: a difference calculation unit that calculates difference information between the captured images adjacent to each other; a data generation unit that generates data based on the difference information, the data indicating the degree of an image defect that occurs when the captured images adjacent to each other are joined in a predetermined position; a determination unit that determines a joining position between the captured images based on the data, the joining position minimizing the degree of the image defect when the panoramic image is generated by using portions between a specific position in a reference one of the captured images and the specific position in the (N+1)th one of the captured images, the same image as the reference captured image being set as the (N+1)th captured image that follows the Nth one of the captured images, N being a number counted from the reference captured image; and an image generation unit that generates the panoramic image by joining the captured images based on the determined joining position.

The determination unit may determine that the joining position having the smallest degree of the defect in the panoramic image is the eventual joining position among joining positions determined with respect to different specific positions.

The data may be a diagraph in which the degree of the image defect that occurs when the captured images adjacent to each other are joined in the predetermined position is shown as the energy of an edge of a node corresponding to the predetermined position in the captured images.

The data generation unit may calculate the image defect degree that is the mean value of the difference information in the predetermined position between the first one of the captured images and the second one of the captured images adjacent to each other, and the difference information in another position adjacent to the predetermined position in the first captured image and the second captured image, and set the mean value as the energy of the edge between the node corresponding to the predetermined position in the first captured image and the node corresponding to the another position in the second captured image.

The determination unit may determine the joining position between the captured images by identifying the path having the smallest total energy value of the edges between the nodes existing therein among the paths extending from the node corresponding to the specific position in the reference captured image to the node corresponding to the specific position in the (N+1)th captured image in the diagraph.

The image generation unit may generates panoramic images by using different ones of the captured images as the reference captured images, and the image processing device may further include an output unit that outputs an eventual panoramic image that is the panoramic image having the smallest image defect degree among the panoramic images.

An image processing method or a program of one aspect of the present technique is an image processing method or a program for generating a 360-degree panoramic image by joining captured images that are successively taken by an imaging device being rotated. The image processing method or the program includes the steps of: calculating difference information between the captured images adjacent to each other; generating data based on the difference information, the data indicating the degree of an image defect that occurs when the captured images adjacent to each other are joined in a predetermined position; determining a joining position between the captured images based on the data, the joining position minimizing the degree of the image defect when the panoramic image is generated by using portions between a specific position in a reference one of the captured images and the specific position in the (N+1)th one of the captured images, the same image as the reference captured image being set as the (N+1)th captured image that follows the Nth one of the captured images, N being a number counted from the reference captured image; and generating the panoramic image by joining the captured images based on the determined joining position.

In one aspect of the present technique, when a 360-degree panoramic image is generated by joining captured images that are successively taken by an imaging device being rotated, difference information between the captured images adjacent to each other is calculated, and data indicating the degree of an image defect that occurs when the captured images adjacent to each other are joined in a predetermined position is generated based on the difference information. A joining position between the captured images is determined based on the data, so as to minimize the degree of the image defect when the panoramic image is generated by using portions between a specific position in a reference one of the captured images and the specific position in the (N+1)th one of the captured images, the same image as the reference captured image being set as the (N+1)th captured image that follows the Nth one of the captured images, N being a number counted from the reference captured image. The panoramic image is generated by joining the captured images based on the determined joining position.

Effects of the Invention

According to one aspect of the present technique, a panoramic image with higher quality can be obtained.

BRIEF DESCRIPTION OF DRAWINGS

FIG. 24 is a flowchart for explaining a mapping process.

FIG. 25 is a diagram showing a pseudo code of the mapping process.

FIG. 26 is a diagram showing a pseudo code of the mapping process.

FIG. 29 is a diagram showing a pseudo code of cumulative difference value calculation.

FIG. 30 is a diagram showing a pseudo code of the cumulative difference value calculation.

FIG. 31 is a diagram showing a pseudo code of diagraph generation.

FIG. 32 is a diagram showing a pseudo code of the diagraph generation.

FIG. 33 is a diagram showing a pseudo code of the diagraph generation.

FIG. 34 is a diagram showing a pseudo code of a path search.

FIG. 35 is a diagram showing a pseudo code of panoramic image generation.

FIG. 37 is a flowchart for explaining a panoramic image generation process.

FIG. 38 is a diagram showing a pseudo code of image set generation.

MODES FOR CARRYING OUT THE INVENTION

The following is a description of embodiment to which the present technique is applied, with reference to the drawings.

<First Embodiment>

[Outline of the Present Technique]

First, the outline of the present technique is described.

For example, captured images are successively taken while an imaging device such as a camera is rotationally moved, and a homogeneous transformation matrix indicating the positional relationships among those captured images is obtained. In this example, 10 captured images are obtained.

At this point, the above described Cx-Cy coordinate system is defined with respect to the $X_1$-$Y_1$-$Z_1$ coordinate system based on the first captured image, and the respective captured images are projected on a cylindrical surface CL11 according to the expression (3). As a result, the projected images shown in FIG. 7 are obtained.

Figure 1:
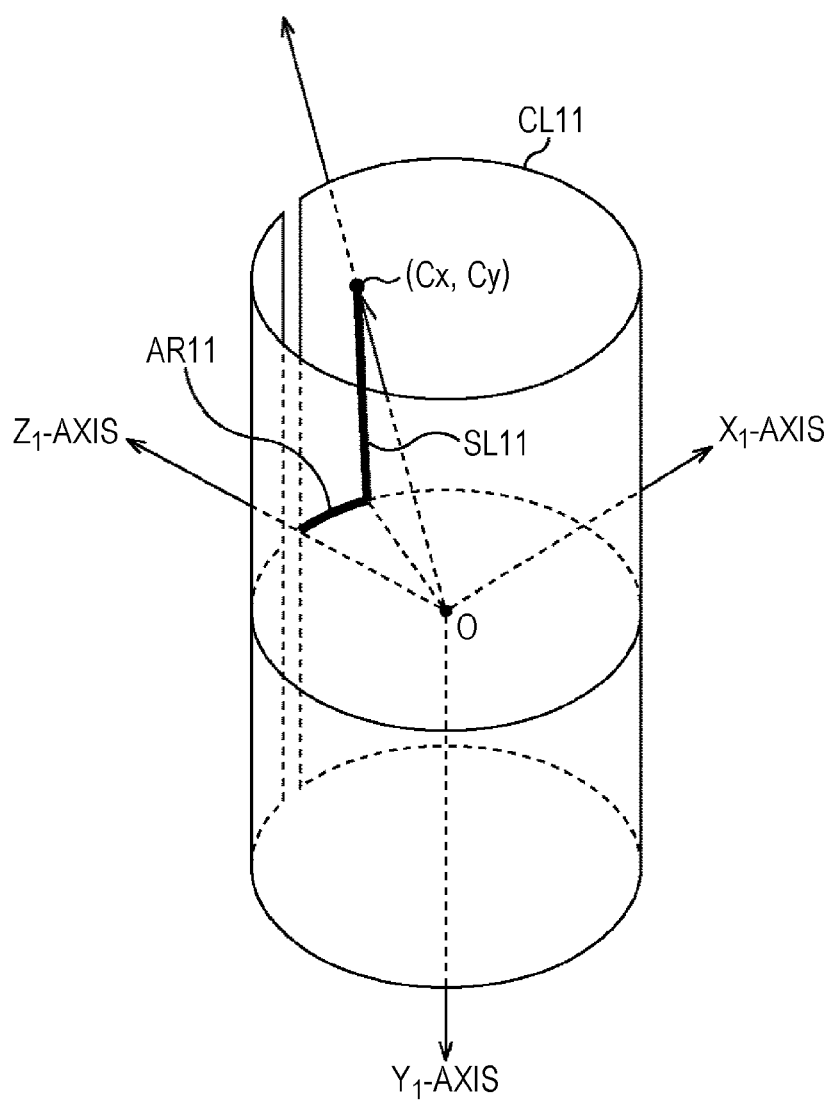
FIG. 1 is a diagram for explaining a cylindrical surface on which captured images are projected.
Figure 2:
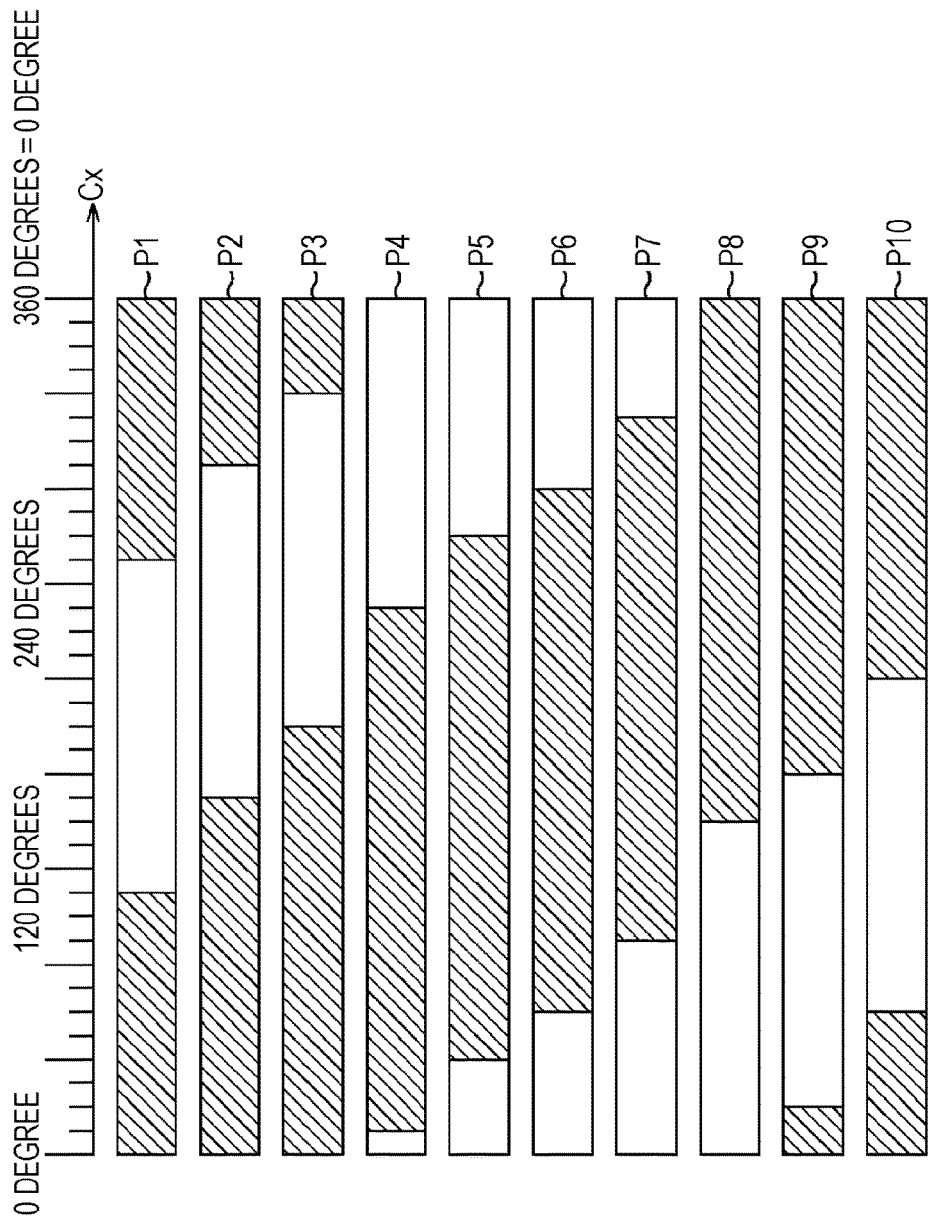
FIG. 2 is a diagram for explaining images projected on the cylindrical surface.
Figure 3:
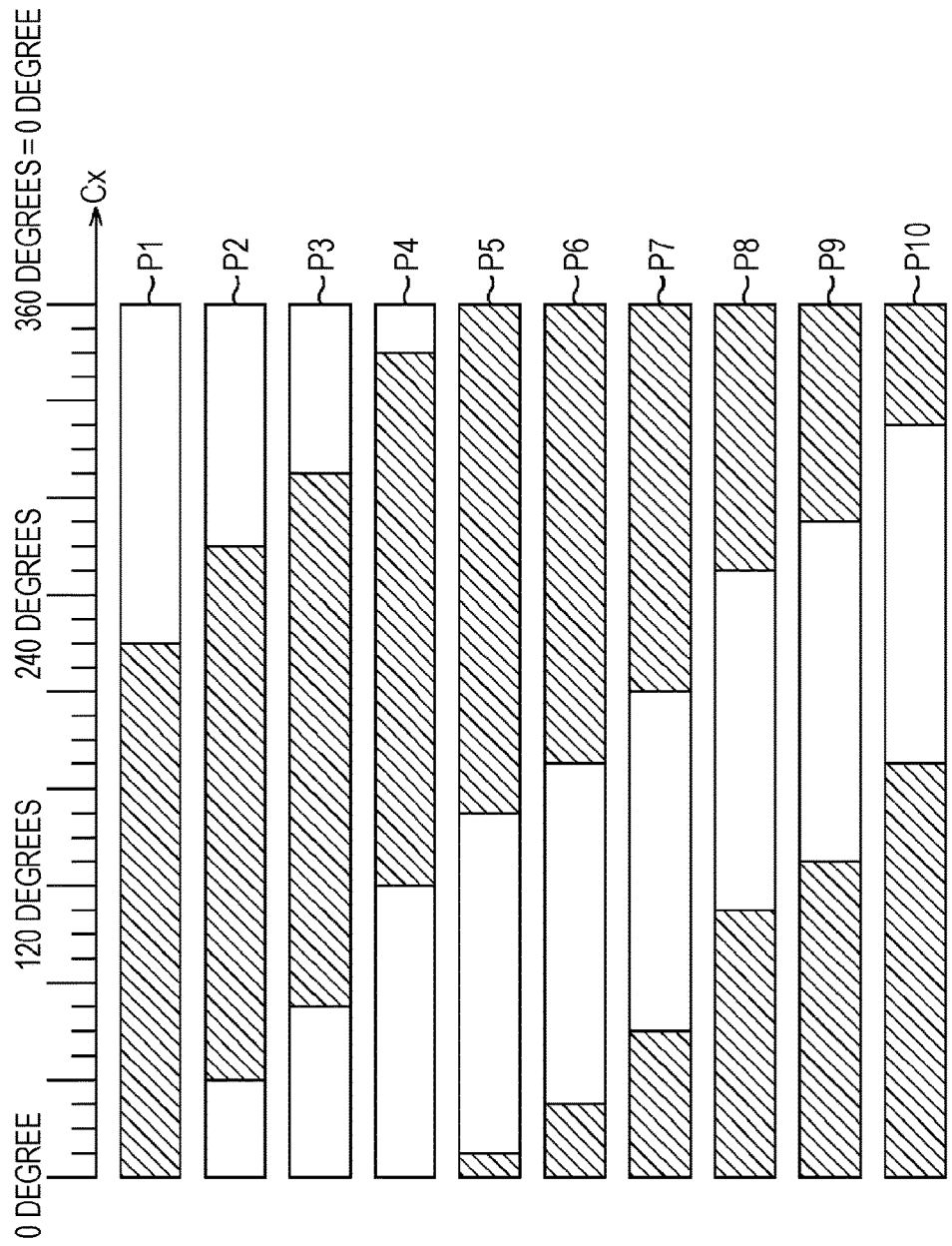
FIG. 3 is a diagram for explaining images projected on the cylindrical surface.
Figure 4:
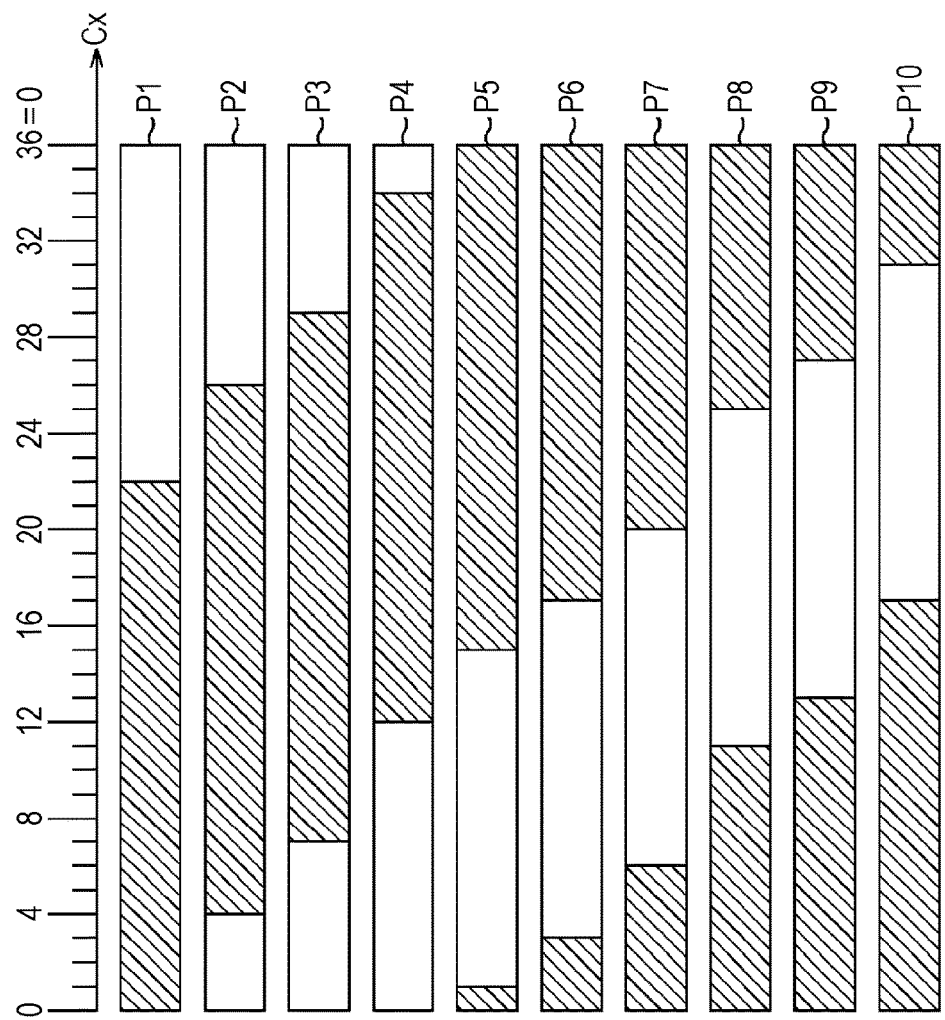
FIG. 4 is a diagram for explaining images projected on the cylindrical surface.
Figure 5:
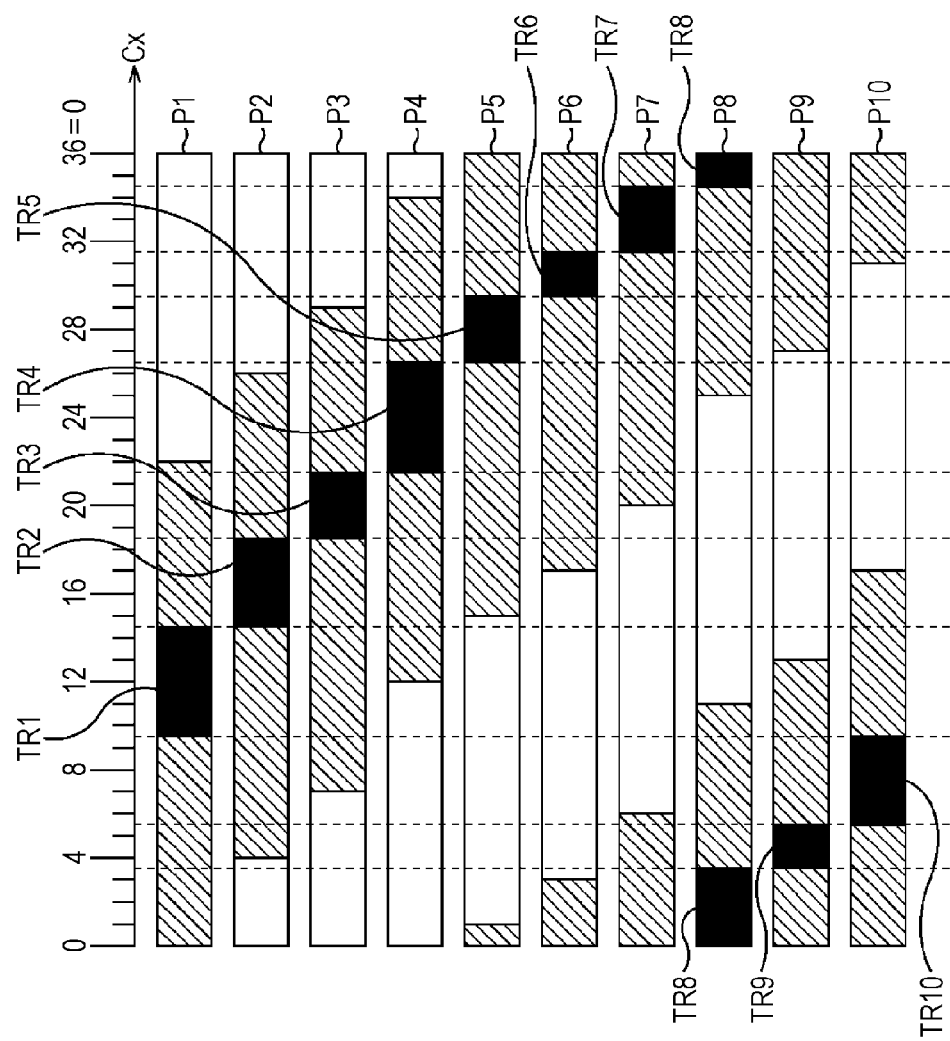
FIG. 5 is a diagram for explaining generation of a panoramic image.
Figure 6:
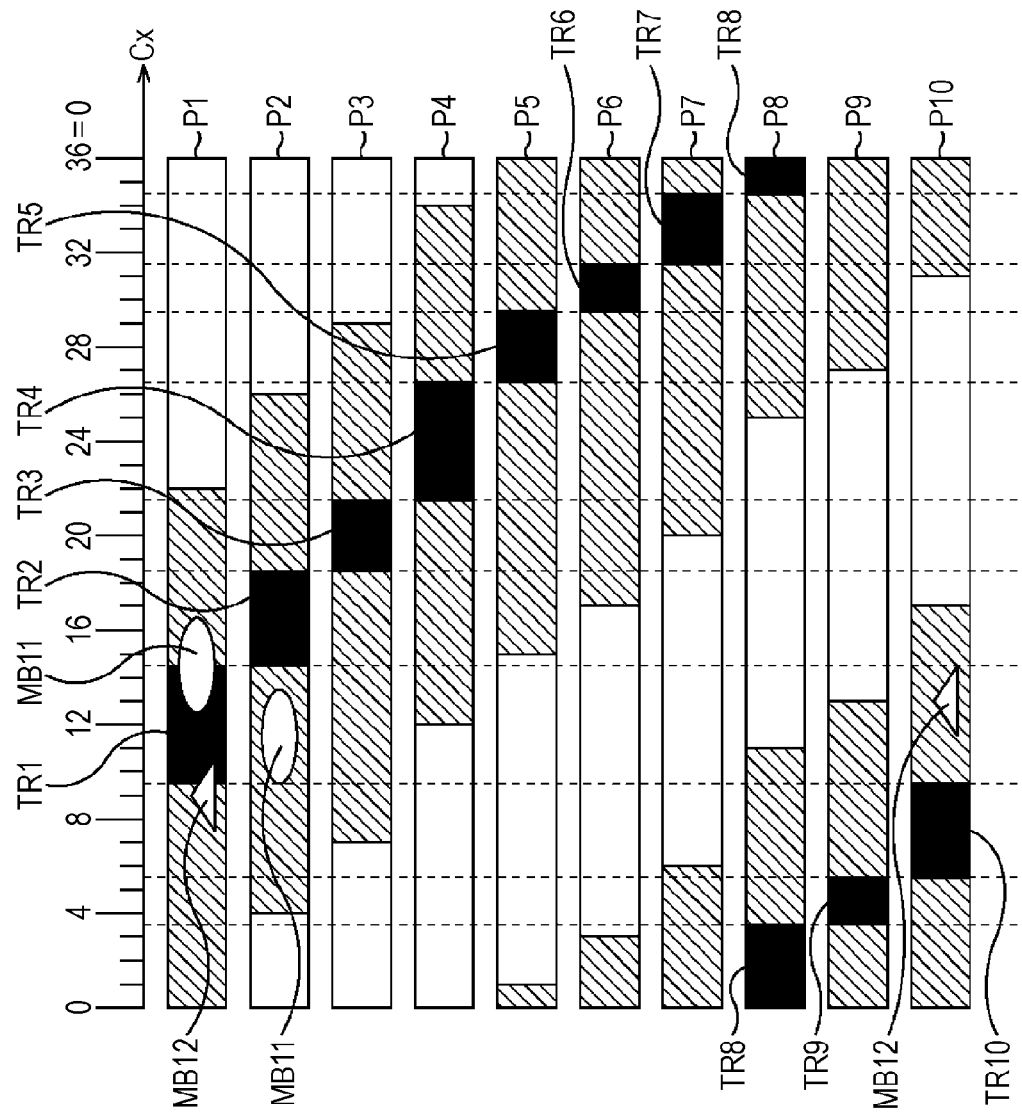
FIG. 6 is a diagram for explaining division of a moving object in a panoramic image.
Figure 7:
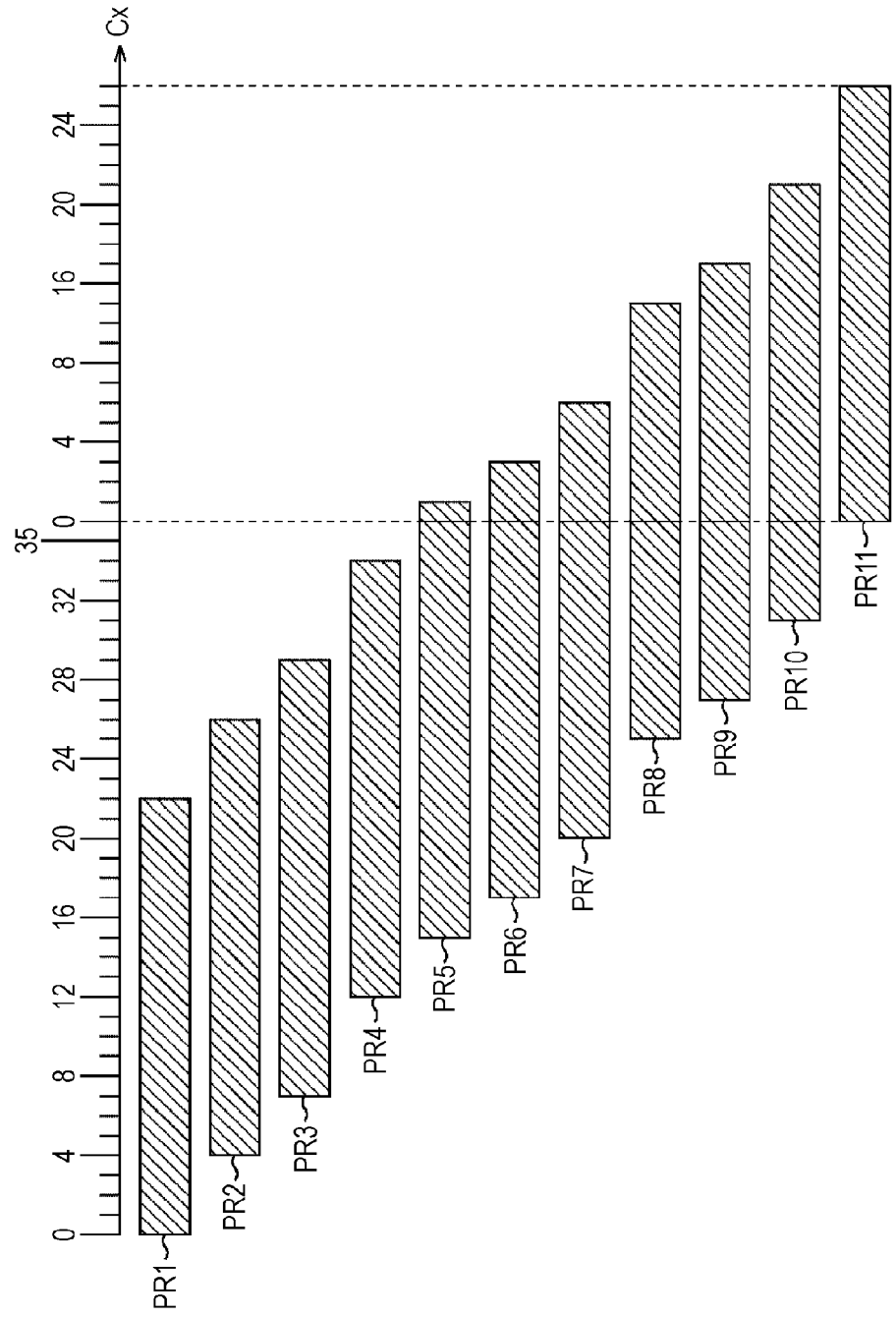
FIG. 7 is a diagram for explaining images projected on a cylindrical surface.

FIG. 7 shows a two-dimensional plane in which the cylindrical surface CL11 having the captured images projected thereon is developed, and the horizontal direction in the drawing indicates the Cx-axis direction in the Cx-Cy coordinate system. Also, in FIG. 7, Cx is defined so that one round of the cylindrical surface CL11 is 36, and an offset is applied so that the position of the left end of the first captured image projected on the two-dimensional plane (the cylindrical surface CL11) in the drawing is represented by Cx=0.

In FIG. 7, projected images PR1 through PR10 are shown as images that are obtained by mapping (projecting) the first through tenth captured images on the cylindrical surface CL11 according to the expression (3). A projected image PR11 is an image obtained by moving the projected image PR1 rightward in the drawing by the amount equivalent to one round, or Cx=36, on the cylindrical surface CL11.

Parts of the respective projected images obtained in the above manner are joined to generate a 360-degree panoramic image. According to the present technique, the joined portions between the projected images adjacent to one another, or the positions of the ends of the regions of the projected images used in generating a panoramic image, are determined by using a diagraph.

Figure 8:
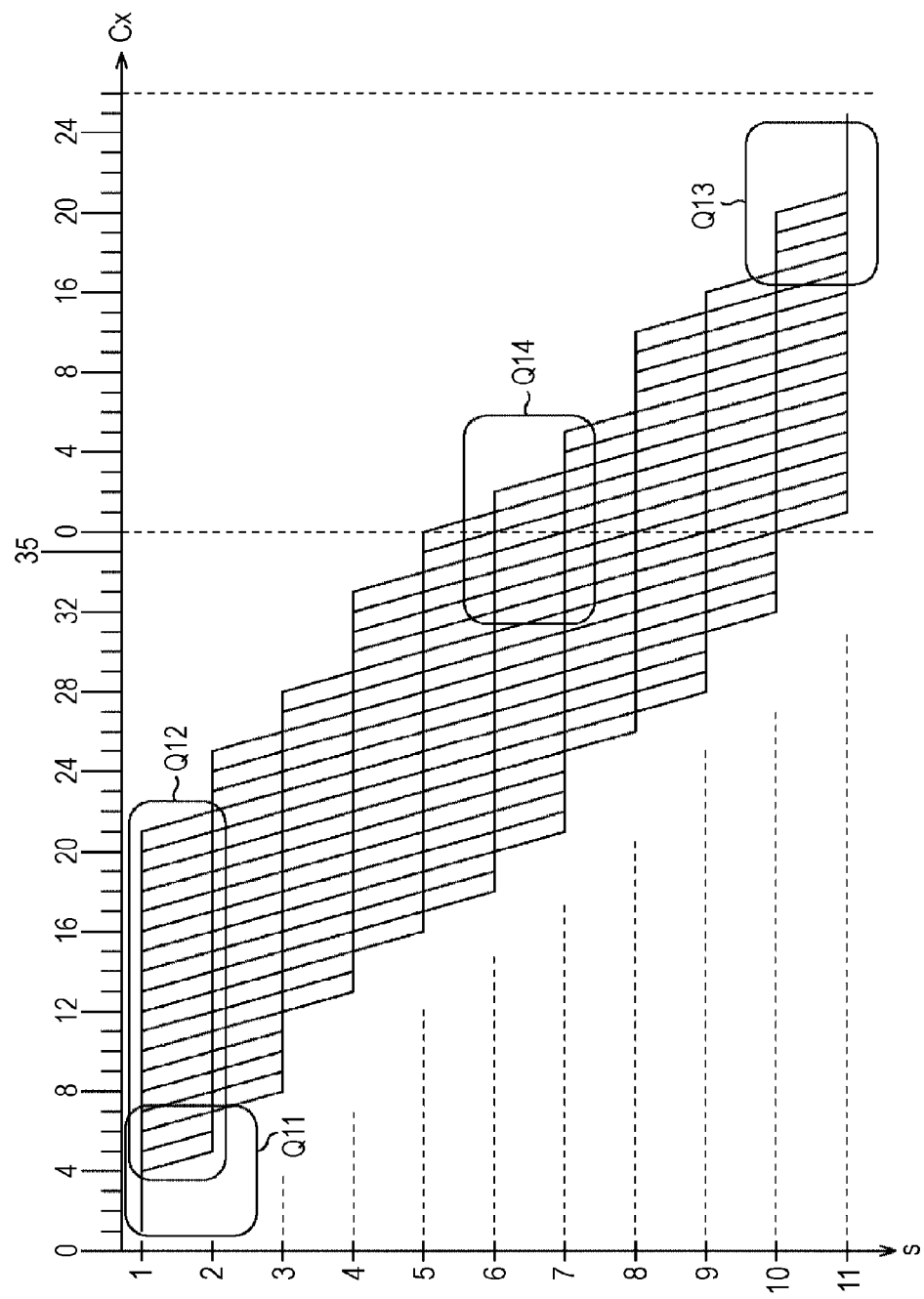
FIG. 8 is a diagram for explaining a diagraph generated from projected images.

For example, based on the respective projected images PR1 through PR11 mapped on the cylindrical surface CL11, the diagraph shown in FIG. 8 is generated.

The horizontal direction in FIG. 8 indicates the Cx-axis direction in the Cx-Cy coordinate system, and the vertical direction indicates the image capturing order of the captured images (the projected images), or a variable s. Here, the first projected image is also used as the eleventh (s=11) projected image as described above.

A diagraph is a graph with directions (arrows), but the diagraph shown in FIG. 8 is formed with line segments, instead of arrows, to avoid complexity.

Therefore, regions Q11 through Q14 of the diagraph are more specifically shown in FIGS. 9 through 12. In FIGS. 9 through 12, the horizontal direction indicates the Cx-axis direction in the Cx-Cy coordinate system, and the vertical direction indicates the image capturing order of the captured images (the projected images).

Figure 9:
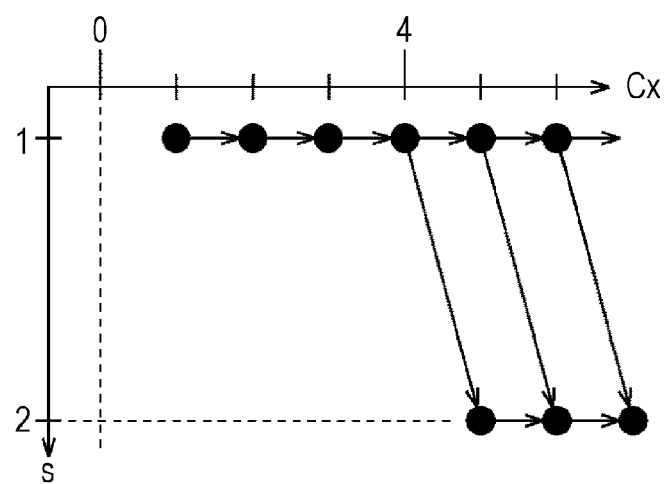
FIG. 9 is a diagram for explaining the diagraph generated from projected images.

FIG. 9 is an enlarged view of the region Q11 of the diagraph shown in FIG. 8. In FIG. 9, nodes represented by circles in the drawing are shown in the region where the projected image PR1 and the projected image PR2 exist, and the respective nodes are connected by arrows.

In this example, the respective nodes adjacent to one another in the Cx-axis direction are connected by arrows, and some of the nodes among the nodes shown in the region where the projected image PR1 exists are connected, by arrows, to nodes that are located in lower right positions with respect to those nodes in the drawing.

It should be noted that a node in the position of Cx in the Cx-axis direction (the Cx-coordinate) in the region corresponding to the sth ($1 \leq s \leq 11$) projected image PRs will be hereinafter also referred to as the node located in the position (Cx, s).

Figure 10:
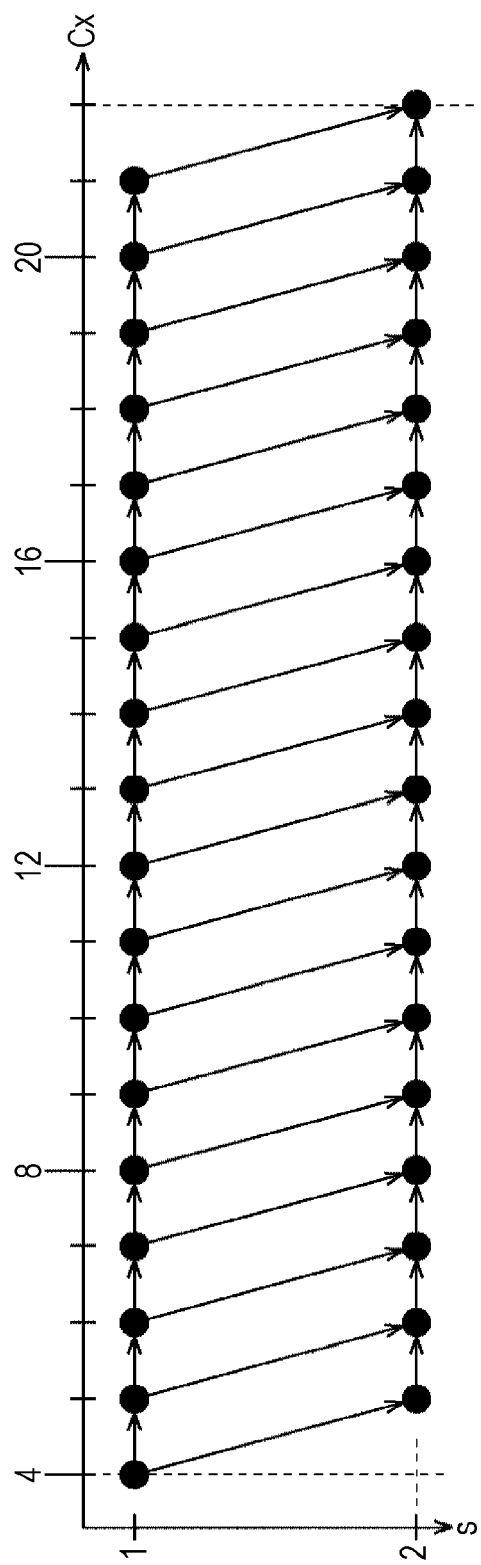
FIG. 10 is a diagram for explaining the diagraph generated from projected images.

FIG. 10 is an enlarged view of the region Q12 of the diagraph shown in FIG. 8. In this example, respective nodes adjacent to one another in the Cx-axis direction are also connected by arrows, and the nodes that have other nodes located in lower right positions in the drawing with respect thereto are connected to the lower right nodes by arrows.

Figure 11:
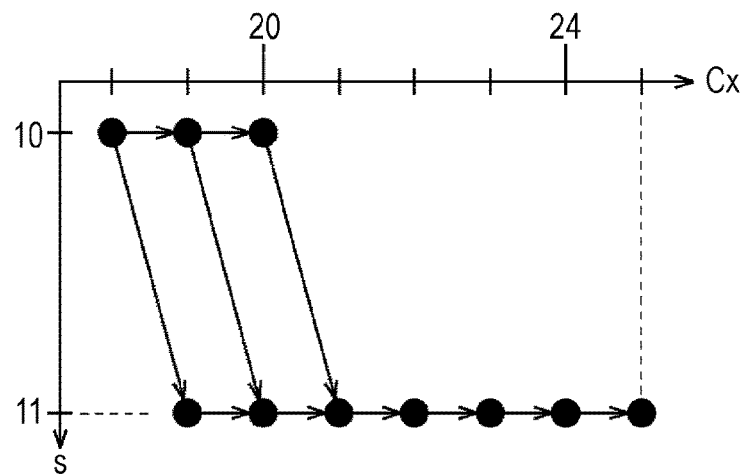
FIG. 11 is a diagram for explaining the diagraph generated from projected images.

Further, FIG. 11 is an enlarged view of the region Q13 of the diagraph shown in FIG. 8. In this example, respective nodes adjacent to one another in the Cx-axis direction and in the lower-right-hand direction in the drawing are also connected by arrows.

Figure 12:
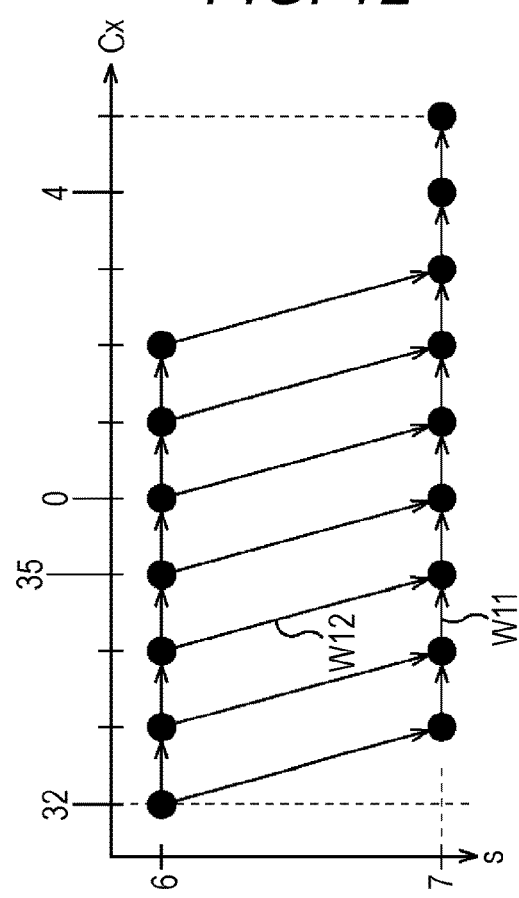
FIG. 12 is a diagram for explaining the diagraph generated from projected images.

Likewise, FIG. 12 is an enlarged view of the region Q14 of the diagraph shown in FIG. 8. In this example, respective nodes adjacent to one another in the Cx-axis direction and in the lower-right-hand direction in the drawing are also connected by arrows.

For example, in FIG. 12, the arrow W11 connecting the node located in the position (Cx, s)=(34, 7) and the node located in the position (35, 7) represents the edge from the position (34, 7) to the position (35, 7).

The arrow W12 connecting the node located in the position (Cx, s)=(34, 6) and the node located in the position (35, 7) represents the edge from the position (34, 6) to the position (35, 7). That is, the arrows connecting the respective nodes represent edges.

As described above, the diagraph shown in FIG. 8 is a directed graph in a direction from left to right in the drawing or in a direction from upper left to lower right in the drawing.

Specifically, the diagraph shown in FIG. 8 is generated from the respective projected images PR1 through PR11 shown in FIG. 7 in the manner described below.

First, the nodes (the start points or the end points of the arrows) in the row at s=1 shown in FIG. 8 are determined by subtracting 1 from either end of the projected image PR1 in the horizontal direction in FIG. 7. That is, as the projected image PR1 exists from 0 to 22 in Cx, nodes are placed in the respective positions of 1 through 21 in Cx minus both ends in the Cx-direction, or in the respective positions (1, 1) through (21, 1). Then, in FIG. 8, where those nodes are the start point and the end point, arrows that extend rightward (the +Cx-axis direction) from and to those nodes are added.

The nodes in the row at s=2 in FIG. 8 are then determined by subtracting 1 from either end of the projected image PR2 in the horizontal direction in FIG. 7. That is, as the projected image PR2 exists from 4 to 26 in Cx, nodes are placed in the respective positions of 5 through 25 in Cx minus both ends in the Cx-direction, or in the respective positions (5, 2) through (25, 2). Then, in FIG. 8, where those nodes are the start points and the end points, arrows that extend rightward (the +Cx-axis direction) from and to those nodes are added.

Thereafter, the nodes in the respective rows at s=3 through 11 in FIG. 8 are generated in the same manner as above. Further, in a case where nodes in two positions (Cx, s) and (Cx+1, s+1) exist with respect to the position (Cx, s) at s=1 through 10 in FIG. 8, an arrow (an edge) that extends downward to the right from the position (Cx, s) to the position (Cx+1, s+1) is added.

In the above manner, one diagraph is generated from the respective projected images. More specifically, energies are assigned to the arrows (edges) connecting the respective nodes in the diagraph, and the joints between the respective projected images, or the positions of the ends (joining positions) of the regions used in generating a panoramic image, are determined based on the energies.

The energy of the arrow (edge) between each two nodes in the diagraph is determined by a difference between the projected image regions corresponding to those two nodes. The following is a description of a method of calculating the energy assigned to an arrow between nodes.

Figure 13:
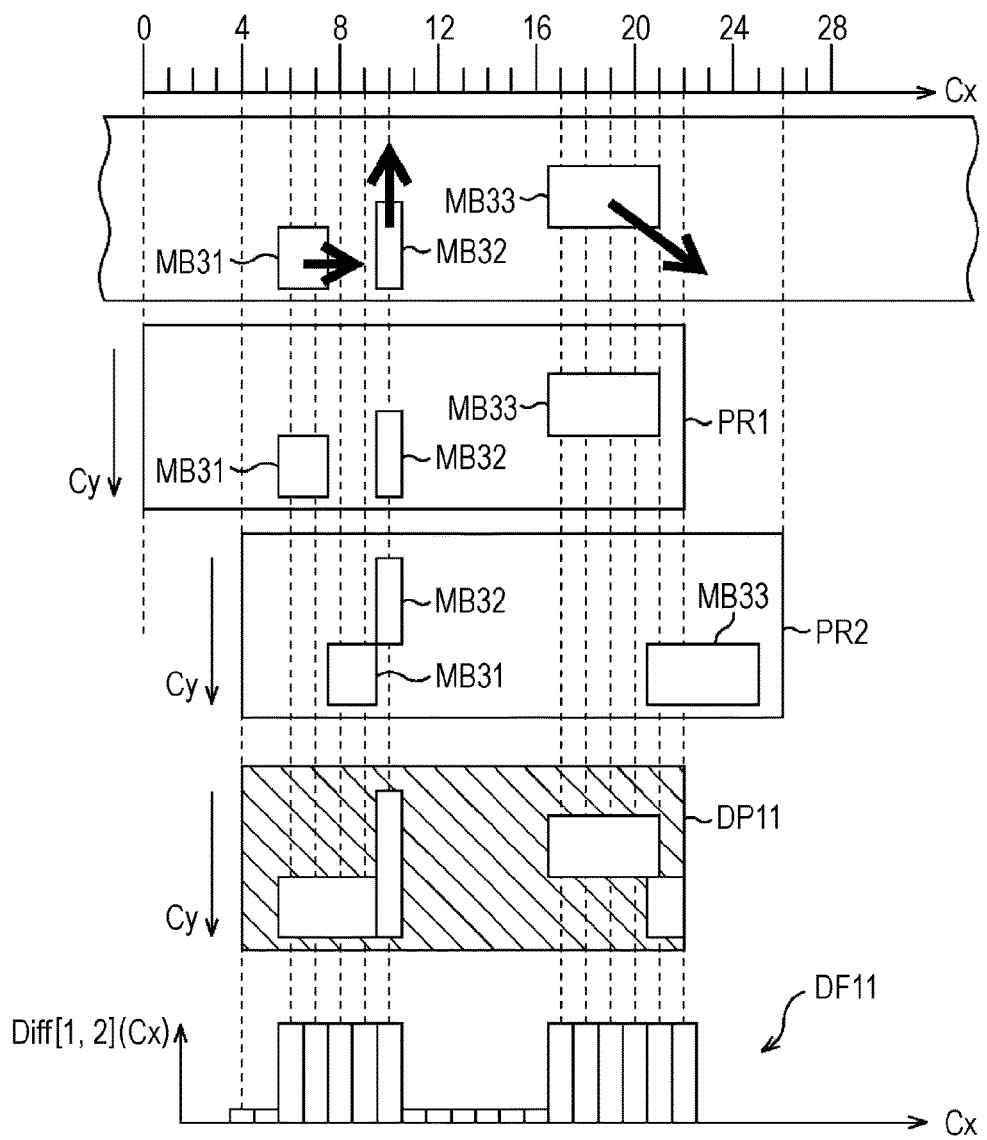
FIG. 13 is a diagram for explaining cumulative difference values.

For example, as shown in FIG. 13, images of three moving objects MB31 through MB33 as objects are captured. In FIG. 13, the horizontal direction and the vertical direction indicate the Cx-axis direction and the Cy-axis direction. In FIG. 13, the portions equivalent to those shown in FIG. 7 are denoted by the same reference numerals as those used in FIG. 7, and explanation of them is not repeated herein.

For example, the moving object MB31 is moving rightward in the drawing, or in the +Cx-axis direction in the Cx-Cy coordinate system. The moving object MB32 is moving upward in the drawing, or in the −Cy-axis direction in the Cx-Cy coordinate system. The moving object MB33 is moving diagonally downward to the right in the drawing.

In this case, the second image is captured after the first image is captured. Therefore, the moving objects MB31 through MB33 move between those two captured images.

Therefore, the positions of the moving objects MB31 through MB33 in the Cx-Cy coordinate system in the projected image PR1 obtained by mapping the first captured image on the cylindrical surface CL11 differ from those in the second projected image PR2.

When the difference between the overlapping portions of the projected image PR1 and the projected image PR2 is calculated, a difference image DP11 is obtained. For example, the pixel value of the pixels of this difference image DP11 is the absolute value of the difference between the pixel value of the pixels of the projected image PR1 located in the same positions as the pixels of the difference image DP11 and the pixel value of the pixels of the projected image PR2.

Accordingly, in the difference image D11P, the regions formed with pixels having pixel values equal to or greater than a predetermined threshold value, or pixels having pixel values that are not 0, are the regions on which images of the moving objects are projected. In FIG. 13, the unshaded regions in the difference image DP11 indicate the regions of the moving objects.

Further, when the pixels aligned in the Cy-axis direction in the difference image DP11, or the pixel values of the pixels having the same Cx-coordinate in terms of the Cx-coordinate, are accumulated (the images are transferred onto the Cx-axis), a cumulative difference value Diff[1, 2](Cx) between the projected image PR1 and the projected image PR2 is obtained as indicated by an arrow DF11.

Here, the cumulative difference value Diff[1, 2](5) is the total sum of the pixel values of the respective pixels at Cx=5 in the difference image DP11.

In the positions Cx in which the cumulative difference value Diff[1, 2](Cx) obtained in the above manner is not 0, the moving objects are shown in the first and second captured images or the projected images PR1 and PR2. In the positions Cx in which the cumulative difference value Diff[1, 2](Cx) is 0, the moving objects are not shown in the first and second captured images (the projected images PR1 and PR2).

Hereinafter, the cumulative difference value of a position Cx determined from a difference image obtained from the projected image PRs corresponding to the sth captured image and the projected image PRs+1 corresponding to the (s+1)th captured image will be represented by Diff[s, s+1](Cx).

According to the present technique, the cumulative difference values Diff[s, s+1](Cx) obtained in the above manner are reflected by the diagraph shown in FIG. 8. That is, the energies of the arrows (edges) between the nodes are determined based on the respective cumulative difference values Diff[s, s+1](Cx).

Figure 14:
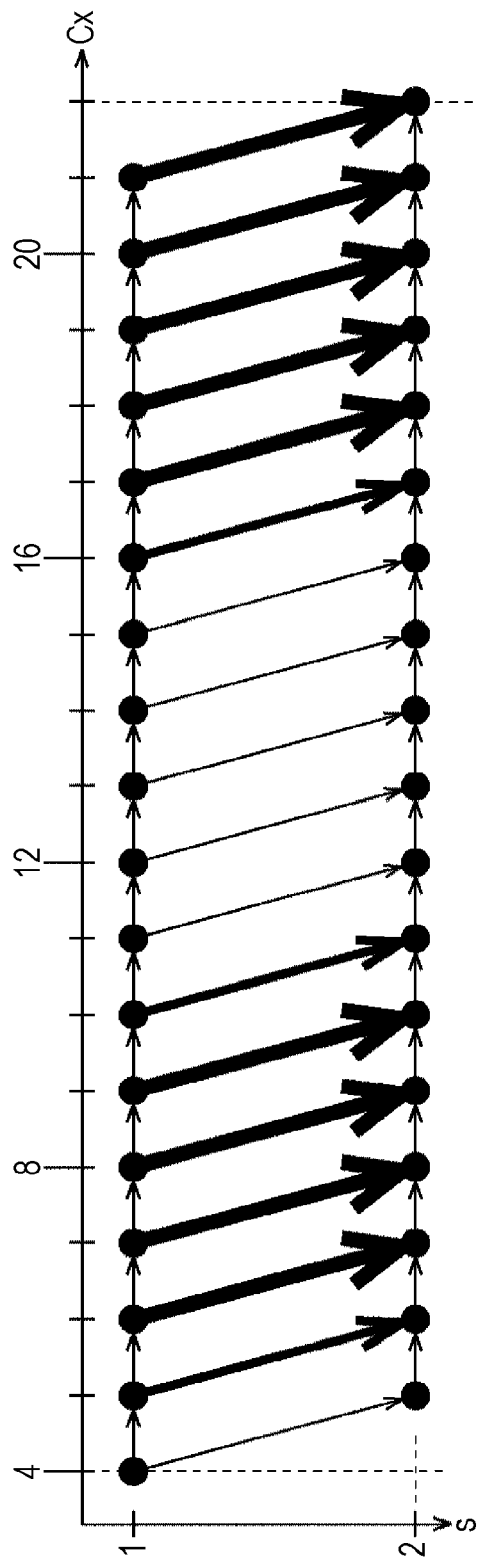
FIG. 14 is a diagram for explaining energies assigned to the edges in the diagraph.

Specifically, when energies are assigned to the region Q12 in the diagraph shown in FIG. 8, or the respective nodes in the enlarged portion shown in FIG. 10, for example, the results are as shown in FIG. 14. In FIG. 14, the horizontal direction indicates the Cx-axis direction, and the vertical direction indicates the image capturing order of the captured images (the projected images).

In FIG. 14, the thickness of an arrow (an edge) between nodes indicates the amount of the energy assigned to the arrow, and a thicker arrow indicates a larger energy.

For example, in the drawing where the node located in the position (Cx, 1) is the start point and the node located in the position (Cx+1, 2) is the end point, the energy of the arrow (edge) that extends downward to the right from the node located in the position (Cx, 1) to the node located in the position (Cx+1, 2) is the mean value of the cumulative difference value Diff[1, 2](Cx) and the cumulative difference value Diff[1, 2](Cx+1).

Therefore, the cumulative difference value becomes larger as the Cy-direction area of the moving object located in the projected images corresponding to the positions of those nodes and movement of the moving object become larger, and, as a result, the energy of the arrow between the nodes becomes larger. That is, the arrow between the nodes becomes thicker. In FIG. 14, the energies of the arrows between the nodes aligned in the right-hand direction or the Cx-axis direction are basically 0.

Meanwhile, determining a boundary position between the regions of projected images to be used in generating a 360-degree panoramic image is equivalent to determining a path from the node located in the position (Cx, 1) in the diagraph to the node in the position (Cx, 11) via a few nodes.

Figure 15:
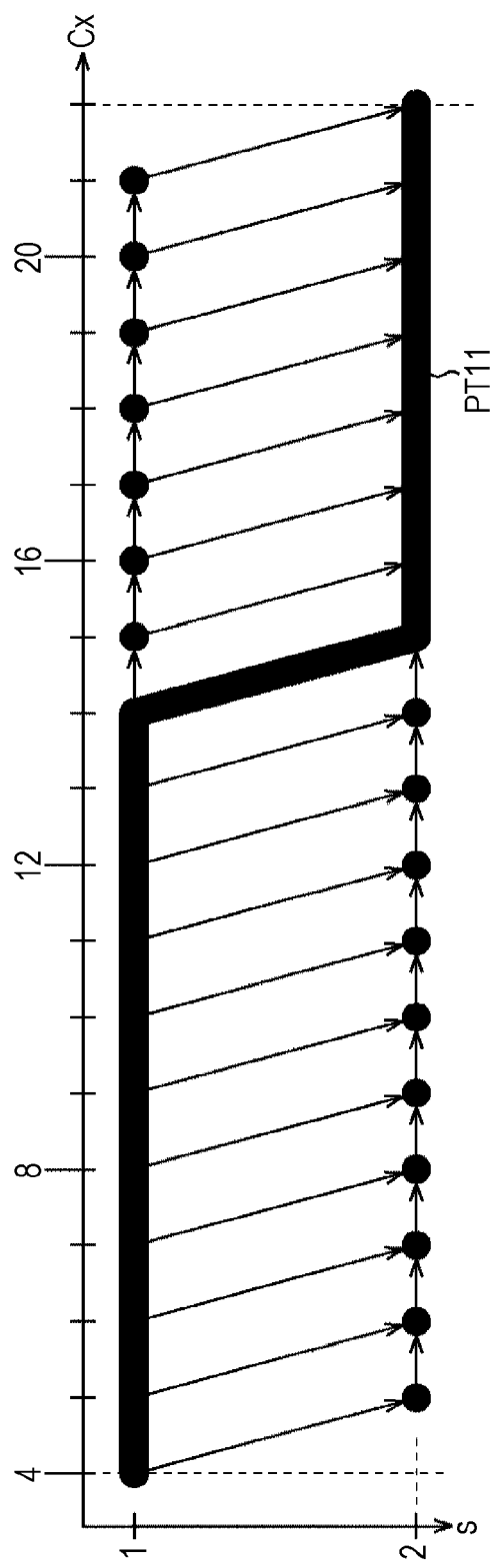
FIG. 15 is a diagram for explaining a path that extends through specific nodes in the diagraph.

Specifically, with attention being drawn to the portion of s=1 to 2 in the diagraph shown in FIG. 8, for example, a path PT11 that extends from the node located in the position (Cx, s)=(4, 1) to the position (22, 2) via the position (14, 1) and the position (15, 2) as shown in FIG. 15 is now described.

This path PT11 means that the region from 4 to 14 in Cx in the projected image PR1 and the region from 15 to 22 in Cx in the projected image PR2 are used in generating a 360-degree panoramic image.

As can be seen from the energies of the arrows between the nodes in the diagraph shown in FIG. 14, a small energy is assigned to the arrow that extends downward to the right from the node located in the position (14, 1) to the node located in the position (15, 2). Therefore, when the total energy of the edges (the arrows between the nodes) existing in the path PT11 is calculated as the total energy value of the path PT11, the total energy value is small.

Here, the energies of the arrows between the respective nodes become smaller as the Cy-direction area of a moving object and movement of the moving object located in the projected images corresponding to the positions of those nodes become smaller. Accordingly, as the total energy value of the path PT11 becomes smaller, the resultant image has fewer defects, such as fewer divided portions of a moving object at the joint between the projected image PR1 and the projected image PR2.

Figure 16:
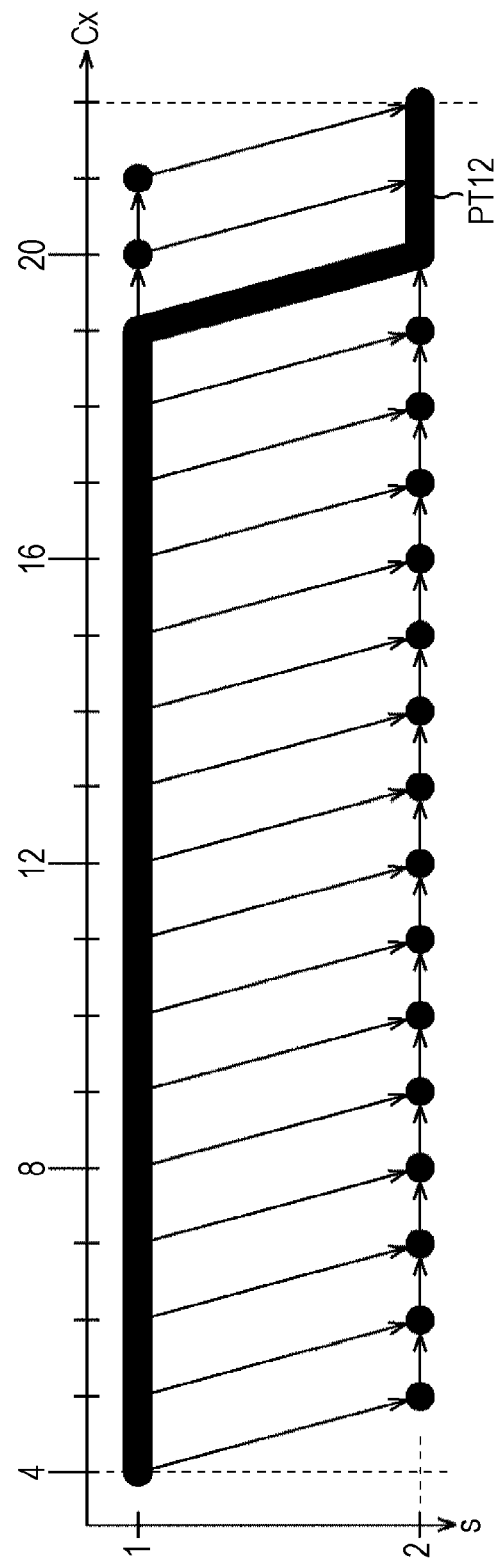
FIG. 16 is a diagram for explaining a path that extends through specific nodes in the diagraph.

Referring now to FIG. 16, a path PT12 that extends from the node located in the position (Cx, s)=(4, 1) to the position (22, 2) via the position (19, 1) and the position (20, 2) is now described.

This path PT12 means that the region from 4 to 19 in Cx in the projected image PR1 and the region from 20 to 22 in Cx in the projected image PR2 are used in generating a 360-degree panoramic image.

As can be seen from the energies of the arrows between the nodes in the diagraph shown in FIG. 14, a large energy is assigned to the arrow that extends downward to the right from the node located in the position (19, 1) to the node located in the position (20, 2).

Therefore, the total energy value of the path PT12 is a large value. It is apparent that, if a panoramic image is generated by joining the regions of the projected images PR1 and PR2 defined by this path PT12, the resultant image has a larger number of defects, and the quality of the panoramic image is poorer.

Figure 17:
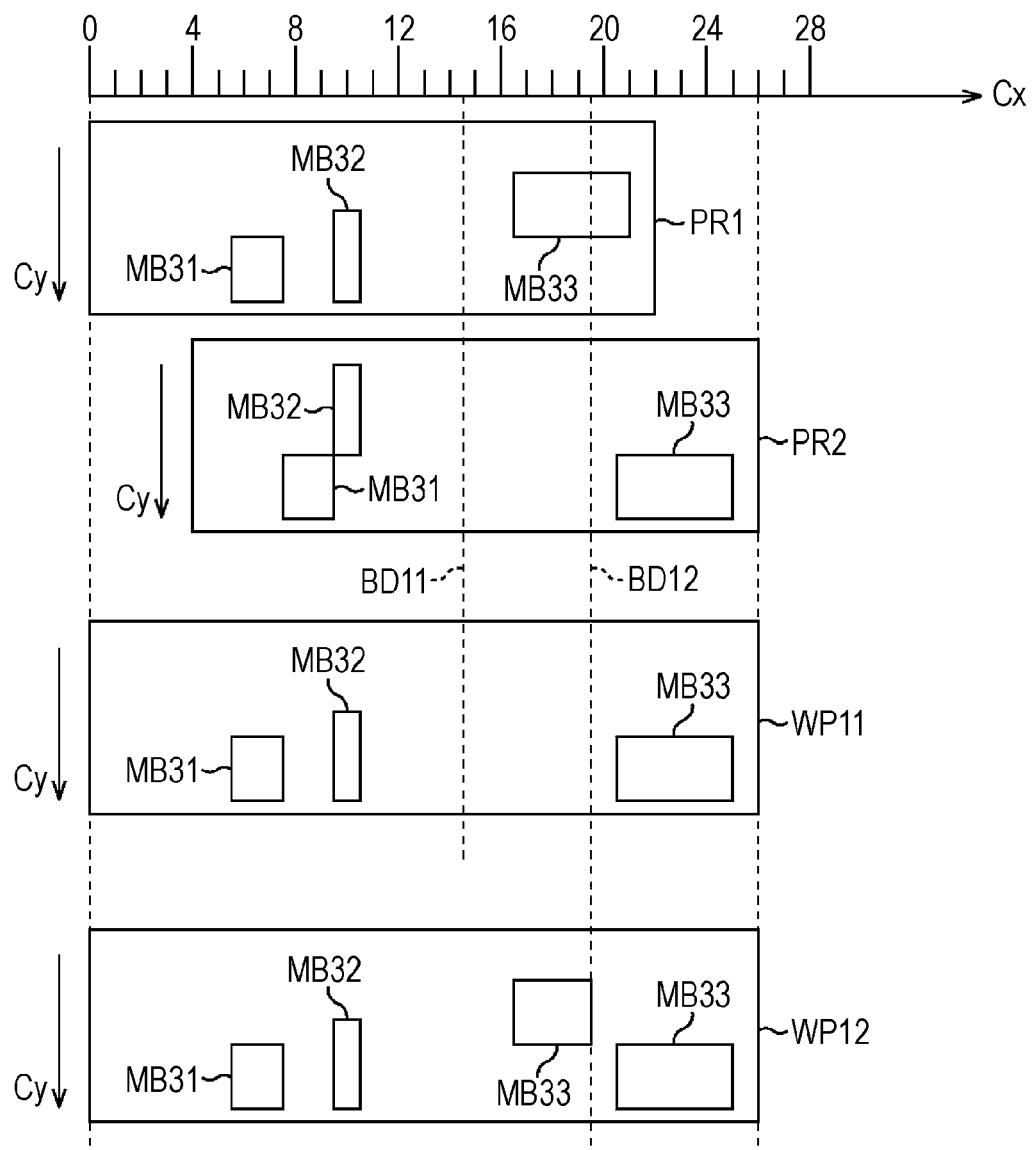
FIG. 17 is a diagram for explaining path selection and division of a moving object in a panoramic image.

As described above, the difference in panoramic image quality between a panoramic image generated by using the projected image regions defined by the path PT11 and a panoramic image generated by using the projected image regions defined by the path PT12 is large as shown in FIG. 17.

In FIG. 17, the horizontal direction indicates the Cx-axis direction, and the vertical direction indicates the Cy-axis direction. In FIG. 17, the portions equivalent to those shown in FIG. 13 are denoted by the same reference numerals as those used in FIG. 13, and explanation of them is not repeated herein.

In FIG. 17, a dotted line BD11 indicates the boundary position (the joining position) between the projected images defined by the path PT11, and a dotted line BD12 indicates the boundary position (the joining position) between the projected images defined by the path PT12.

In a case where the boundary position is represented by the dotted line BD11 defined by the path PT11, for example, a panoramic image WP11 is generated by joining the region of the projected image PR1 on the left side of the dotted line BD11 and the region of the projected image PR2 on the right side of the dotted line BD11. That is, the panoramic image WP11 is formed by joining the region in the positions Cx from 0 to 14 in the projected image PR1 and the region in the positions Cx from 15 to 26 in the projected image PR2.

In this case, there are no moving objects near the dotted line BD11 in the projected images PR1 and PR2. Accordingly, the high-quality panoramic image WP11 with no defects can be obtained.

In a case where the boundary position is represented by the dotted line BD12 defined by the path PT12, on the other hand, a panoramic image WP12 is generated by joining the region of the projected image PR1 on the left side of the dotted line BD12 and the region of the projected image PR2 on the right side of the dotted line BD12. That is, the panoramic image WP12 is formed by joining the region in the positions Cx from 0 to 19 in the projected image PR1 and the region in the positions Cx from 20 to 26 in the projected image PR2.

In this case, there is the moving object MB33 near the dotted line BD12 in the projected image PR1, and the moving object MB33 in the projected image PR2 is in a position apart from the dotted line BD12. Therefore, an image defect occurs near the dotted line BD12.

That is, only part of the moving object MB33 is shown near the dotted line BD12 in the panoramic image WP12, and the same moving object MB33 is further shown on the right side of the partial moving object MB33.

In view of the above, the following is normally true. The cumulative difference value Diff[s, s+1](Cx) is calculated from the difference between the overlapping portions of the sth projected image and the (s+1)th projected image, and the cumulative difference value Diff[s, s+1](Cx) is reflected by the energies in the diagraph shown in FIG. 8.

As for a path existing in the diagraph shown in FIG. 8, this path extends through the arrow that extends downward to the right from the node located in the position (Cx', s) to the node located in the position (Cx'+1, s+1).

At this point, determining such a path is associated with generating a panoramic image by using the region in the positions Cx of Cx' or less in the sth projected image and the region in the positions Cx of Cx'+1 or greater in the (s+1)th projected image.

In this case, if the total energy value of the determined path is large, there is a moving object existing in the portions Cx of Cx' and Cx'+1 in the sth and (s+1)th projected images. As a result, a defect occurs in the generated panoramic image due to the divided moving object in the portions Cx of Cx' and Cx'+1. If the total energy value of the determined path is small, on the other hand, there are no moving objects existing in the joined portion (joining position) between the projected images, a high-quality panoramic image without defects is obtained.

In view of this, if the path with the smallest total energy value is detected in the diagraph shown in FIG. 8, a panoramic image of a moving object with fewer defects can be obtained by using the regions of respective projected images defined by the path.

Specifically, paths that extend from the node located in the position (Cx, s)=(1, 1) to the node located in the position (Cx, s)=(1, 11) in the diagraph are first determined, and a search for the path with the smallest total energy value is conducted among those paths. The search for the path with the smallest total energy value can be conducted by dynamic programming, for example.

Figure 18:
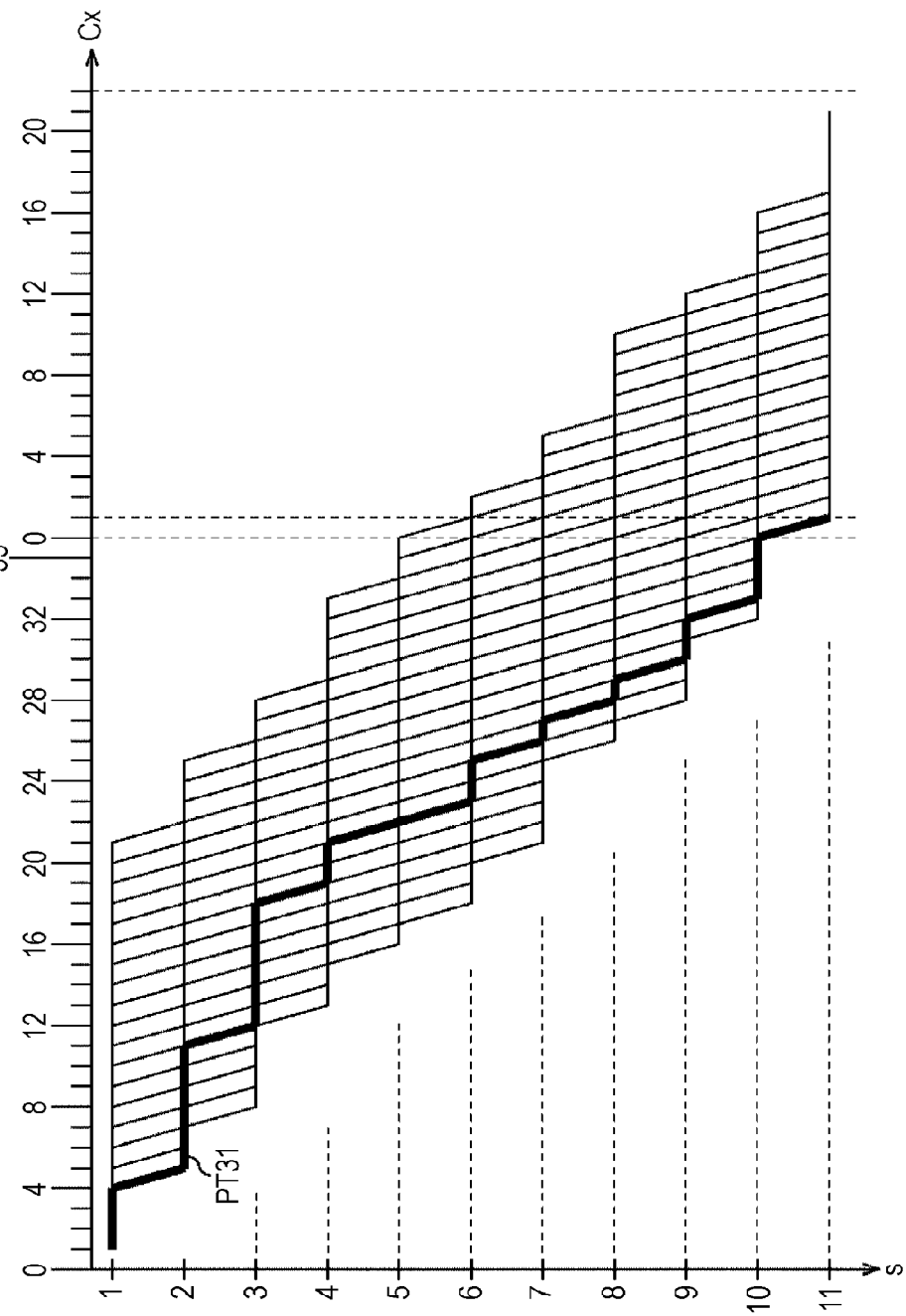
FIG. 18 is a diagram for explaining a path that extends through specific nodes in the diagraph.

In the above manner, the path PT31 shown in FIG. 18 is obtained as the path with the smallest total energy value, for example. In FIG. 18, the horizontal direction indicates the Cx-axis direction, and the vertical direction indicates the image capturing order of the captured images (the projected images).

FIG. 18 shows the path PT31 that extends from the node in the position (1, 1) to the node in the position (1, 11) in the same diagraph as the diagraph shown in FIG. 8.

After the path PT31 that extends from the node in the position (1, 1) and has the smallest total energy value is obtained in the above described manner, a search for the path with the smallest total energy value is conducted among the paths that extend from the node in the position (Cx, s)=(2, 1) to the node in the position (2, 11).

Likewise, for each of the positions Cx=3 through 21 in the diagraph, a search for the path with the smallest total energy values is conducted among the paths that extend from the node in the position (Cx, s)=(Cx, 1) to the node in the position (Cx, 11).

Figure 19:
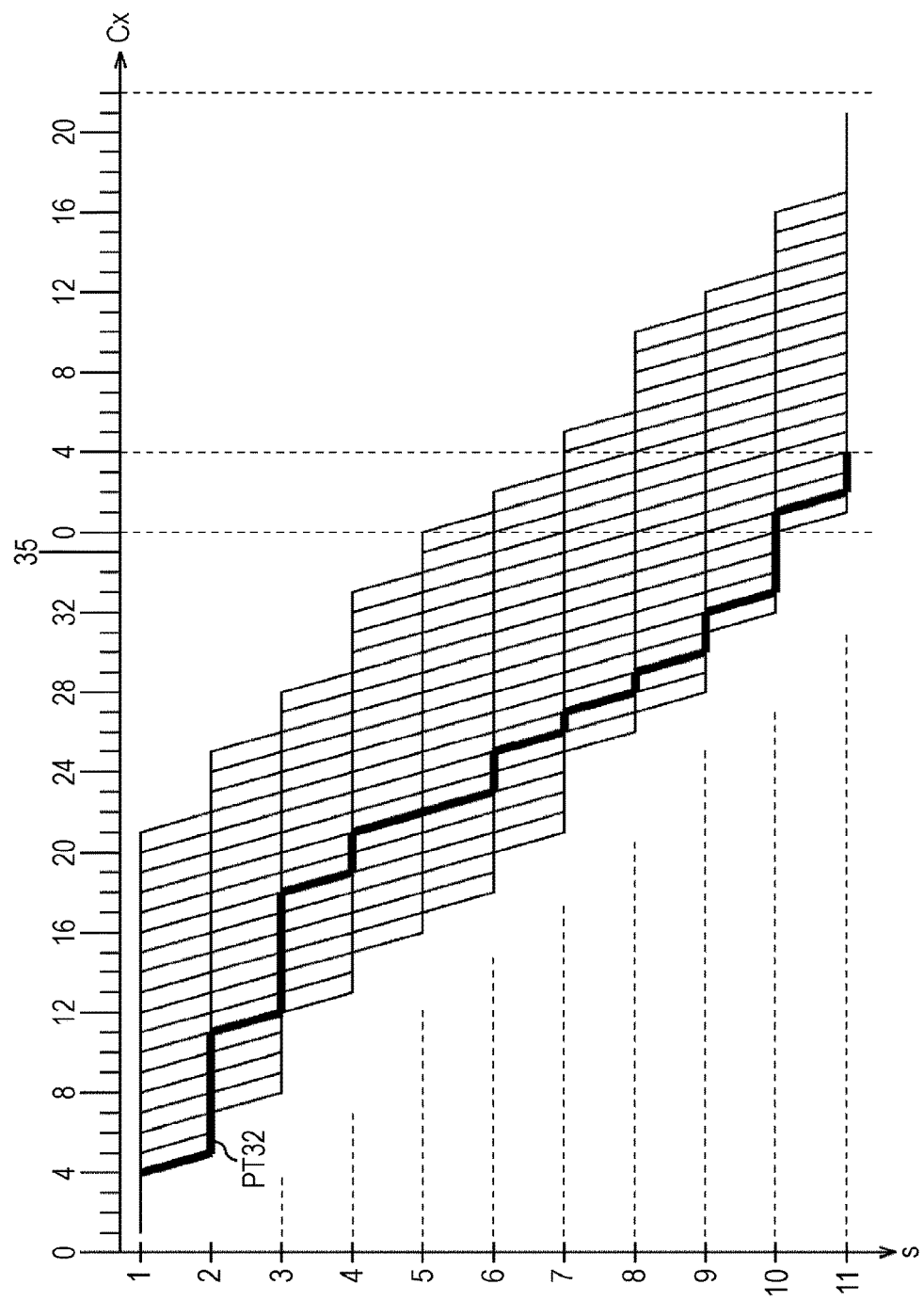
FIG. 19 is a diagram for explaining a path that extends through specific nodes in the diagraph.

For example, a search for the path with the smallest total energy value is conducted among the paths that extend from the node in the position (Cx, s)=(4, 1) to the node in the position (4, 11) in the diagraph, to obtain the path PT32 shown in FIG. 19.

Figure 20:
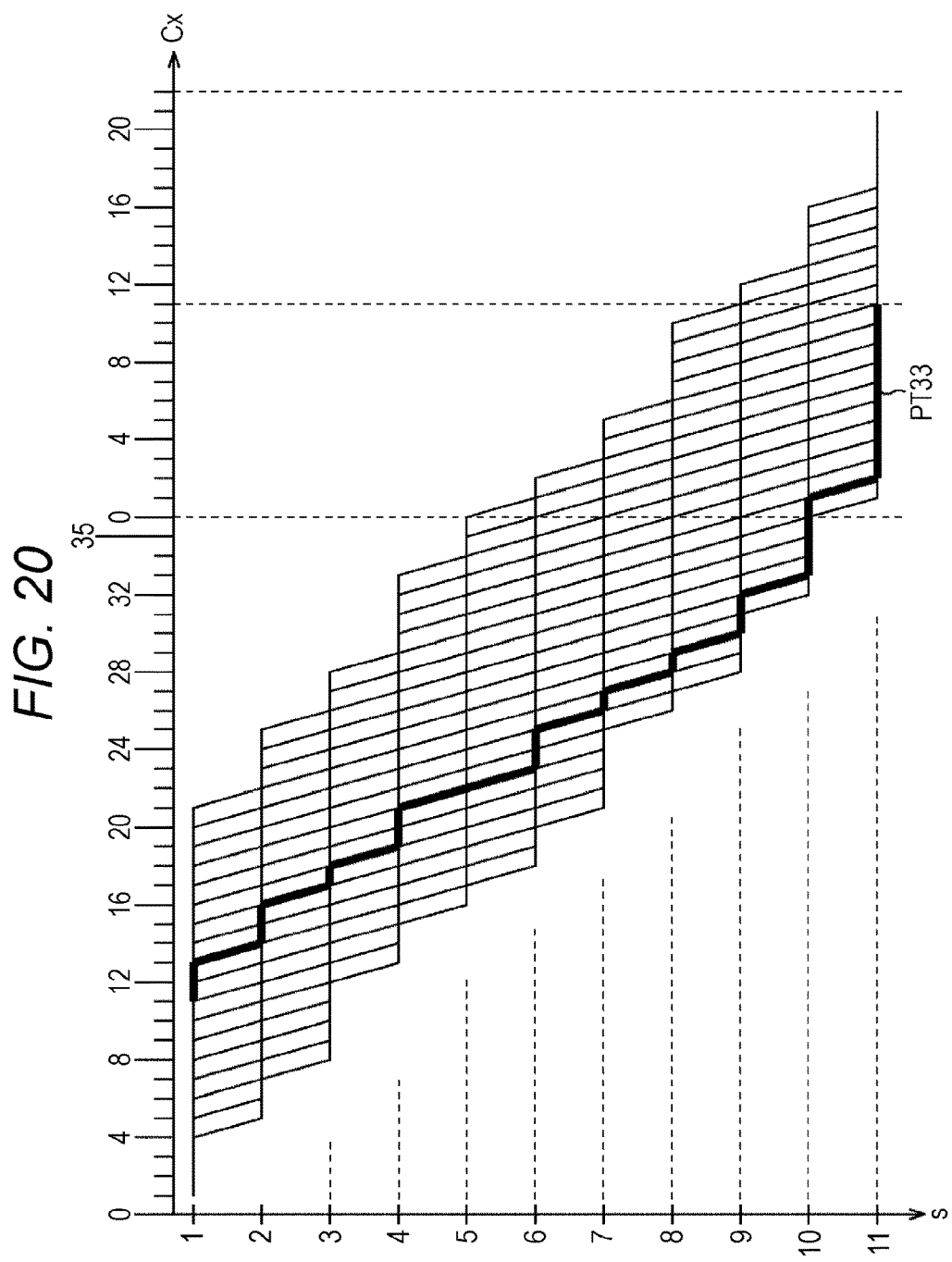
FIG. 20 is a diagram for explaining a path that extends through specific nodes in the diagraph.

Also, a search for the path with the smallest total energy value is conducted among the paths that extend from the node in the position (Cx, s)=(11, 1) to the node in the position (11, 11) in the diagraph, to obtain the path PT33 shown in FIG. 20, for example.

Figure 21:
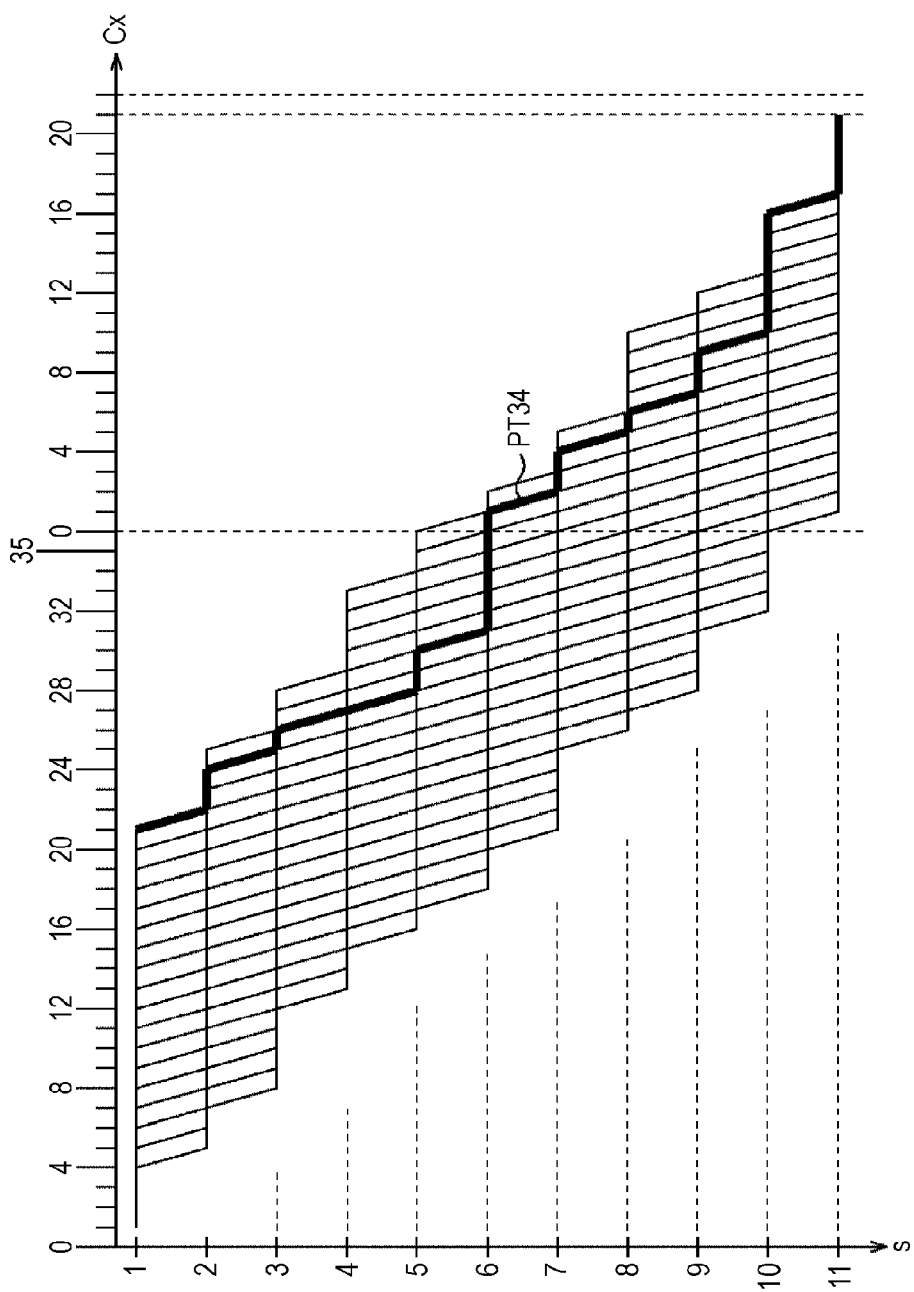
FIG. 21 is a diagram for explaining a path that extends through specific nodes in the diagraph.

Further, a search for the path with the smallest total energy value is conducted among the paths that extend from the node in the position (Cx, s)=(21, 1) to the node in the position (21, 11) in the diagraph, to obtain the path PT34 shown in FIG. 21, for example.

In FIGS. 19 through 21, the horizontal direction indicates the Cx-axis direction, and the vertical direction indicates the image capturing order of the captured images (the projected images).

In the above manner, the paths with the respective smallest total energy values among the paths that extend from the 21 positions (Cx, 1) at Cx=1 through 21 in the diagraph are determined. The path with the smallest total energy value among those 21 paths is the path for eventually generating the panoramic image with the fewest defects. After such a path is determined, a panoramic image generated based on the path is output as the eventual 360-degree panoramic image.

As described above, according to the present technique, a high-quality panoramic image without defects is generated by using a diagraph generated from projected images.

[Example Structure of an Image Processing Device]

Next, a specific embodiment of an image processing device to which the above described present technique is applied is described.

Figure 22:
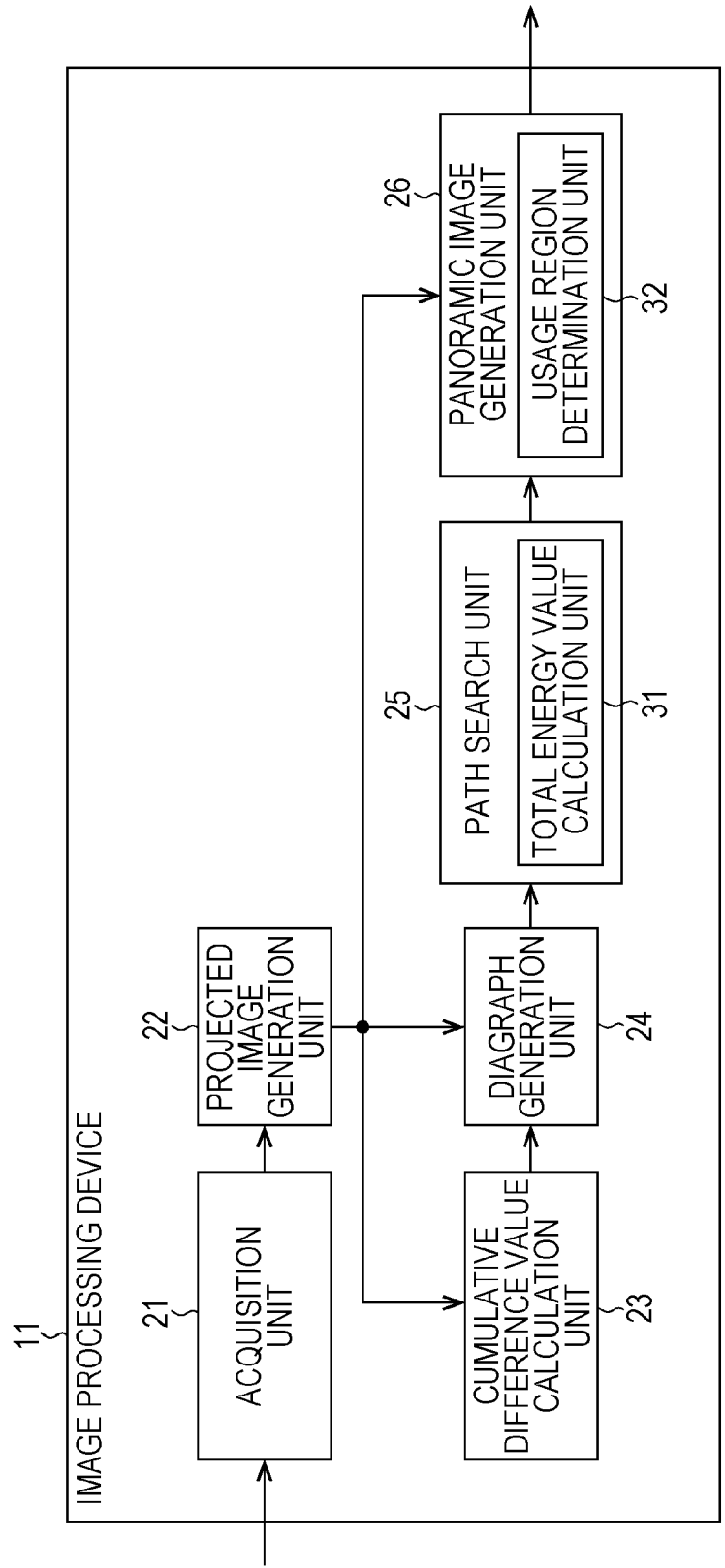
FIG. 22 is a diagram showing an example structure of an image processing device.

FIG. 22 is a diagram showing an example structure of an image processing device to which the present technique is applied. This image processing device 11 includes an acquisition unit 21, a projected image generation unit 22, a cumulative difference value calculation unit 23, a diagraph generation unit 24, a path search unit 25, and a panoramic image generation unit 26.

The acquisition unit 21 acquires N captured images that are successively taken by an imaging device, a homogeneous transformation matrix indicating the positional relationship between each of the captured images and the first captured image, and the like. The acquisition unit 21 supplies the captured images, the homogeneous transformation matrix, and the like to the projected image generation unit 22. Based on the captured images and the homogeneous transformation matrix supplied from the acquisition unit 21, the projected image generation unit 22 generates projected images by projecting (mapping) the captured images on a cylindrical surface. The projected image generation unit 22 also supplies the projected images to the cumulative difference value calculation unit 23, the diagraph generation unit 24, and the panoramic image generation unit 26.

Based on the projected images supplied from the projected image generation unit 22, the cumulative difference value calculation unit 23 calculates cumulative difference values between the projected images adjacent to one another, and supplies the cumulative difference values to the diagraph generation unit 24. Based on the projected images supplied from the projected image generation unit 22 and the cumulative difference values supplied from the cumulative difference value calculation unit 23, the diagraph generation unit 24 generates a diagraph, and supplies the diagraph to the path search unit 25.

Based on the diagraph supplied from the diagraph generation unit 24, the path search unit 25 searches for the path with the smallest total energy value in the diagraph, and supplies the obtained path to the panoramic image generation unit 26. The path search unit 25 includes a total energy value calculation unit 31, and the total energy value calculation unit 31 calculates the total energy values of respective paths during the path search conducted by the path search unit 25.

Based on the path supplied from the path search unit 25 and the projected images supplied from the projected image generation unit 22, the panoramic image generation unit 26 generates and outputs a 360-degree panoramic image. The panoramic image generation unit 26 includes a usage region determination unit 32. Based on the path supplied from the path search unit 25, the usage region determination unit 32 determines the regions in the projected images to be used in generating the panoramic image.

[Description of a Panoramic Image Generation Process]

Figure 23:
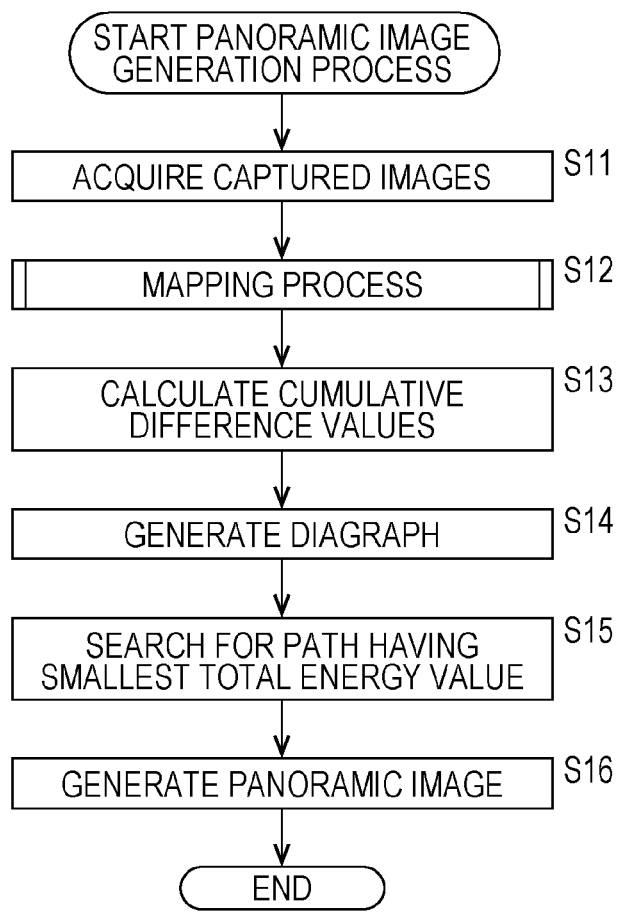
FIG. 23 is a flowchart for explaining a panoramic image generation process.

Referring now to the flowchart shown in FIG. 23, a panoramic image generation process to be performed by the image processing device 11 is described.

In step S11, the acquisition unit 21 acquires N captured images, a homogeneous transformation matrix indicating the positional relationship between each of the captured images and the first captured image, and information indicating the focal length F of each of the captured images, and supplies the captured images, the homogeneous transformation matrix, and the information to the projected image generation unit 22.

Here, the captured images acquired by the acquisition unit 21 are images that are successively captured by an imaging device such as a camera being rotated. The N captured images have the same focal length.

In step S12, the projected image generation unit 22 performs a mapping process, and generates projected images based on the captured images and the homogeneous transformation matrix supplied from the acquisition unit 21.

Referring now to the flowchart shown in FIG. 24, the mapping process corresponding to the process in step S12 is described. This mapping process is equivalent to a process to be performed by using the pseudo code shown in FIGS. 25 and 26.

In step S41, the projected image generation unit 22 secures a first canvas region on which the sth (1≤s≤N) captured image is to be mapped.

For example, the projected image generation unit 22 defines the first canvas region in the above described Cx-Cy coordinate system. At this point, the first canvas region is positioned so that the center position of the first canvas region in the Cy-axis direction at the end of the first canvas region in the −Cx-axis direction is the origin of the Cx-Cy coordinate system.

The width ("width") (hereinafter also referred to as the horizontal width) of the first canvas region in the Cx-axis direction is $2\pi F$, and the width ("height") (hereinafter also referred to as the vertical width) of the first canvas region in the Cy-axis direction is a value obtained by multiplying the number of pixels in the captured image in the Cy-axis direction by 0.9. Here, F used in calculating the horizontal width ("width") is the focal length of the captured image.

Figure 27:
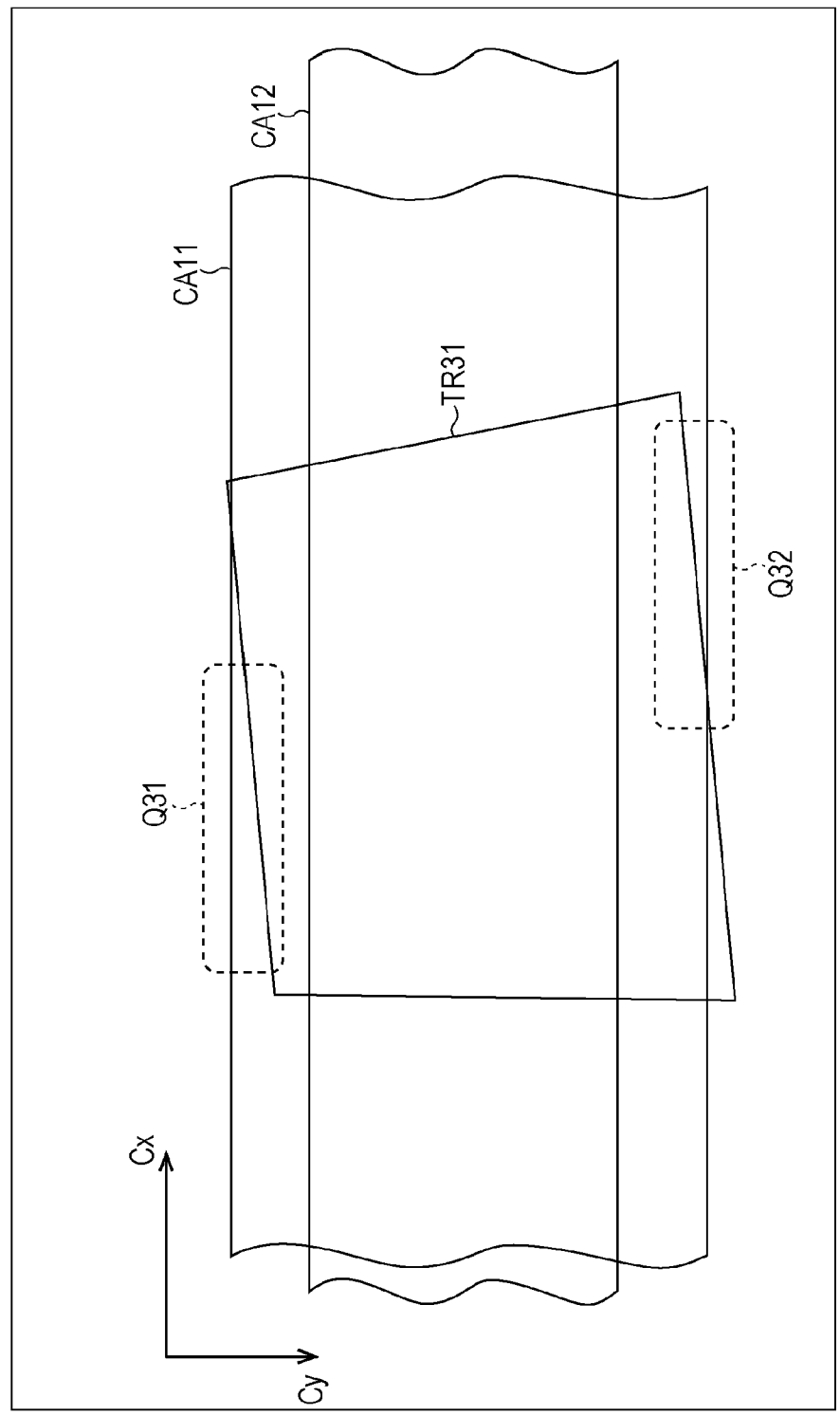
FIG. 27 is a diagram for explaining the length of a first canvas region in the vertical direction.

The vertical width ("height") of the first canvas region is equal to 90% of the number of pixels in the captured image in the Cy-axis direction, so that the ends of the projected image in the Cy-axis direction become parallel to the Cx-axis direction, as shown in FIG. 27, for example. In FIG. 27, the horizontal direction and the vertical direction indicate the Cx-axis direction and the Cy-axis direction, respectively.

For example, a region CA11 having a vertical width ("height") that is substantially equal to the number of pixels in the captured image in the Cy-axis direction is secured as the first canvas region. An image TR31 is the image obtained by mapping the captured image on the cylindrical surface of the Cx-Cy coordinate system.

In this case, the portion of the image TR31 located within the region CA11 is regarded as the projected image. If the region CA11 is too large, a region Q31 and a region Q32 include portions outside the image capturing range of the captured image, and no valid pixel values exist therein. As a result, the ends of the obtained projected image in the Cy-axis direction become non-parallel to the Cx-axis direction.

In view of this, the vertical width ("height") of the first canvas region is reduced by a certain amount, and a region CA12 is set as the first canvas region, for example. As a result, the ends of the obtained projected image in the Cy-axis direction become parallel to the Cx-axis direction.

In a case where a user takes images while rotating the imaging device, the imaging device is rotated in the Cx-axis direction, with the axis being a straight line parallel to the Cy-axis. However, the imaging device may be jiggled in the Cy-axis direction. If the jiggling of the imaging device in the Cy-axis direction is large, the positions of captured images projected on the cylindrical surface greatly vary particularly when the user is taking images in an unstable position. Therefore, the vertical width ("height") needs to be made even smaller.

In step S42, the projected image generation unit 22 writes the sth captured image in the first canvas region, to generate the sth projected image.

For each position (Cx, Cy) (0≤Cx<width, −height/2≤Cy≤height/2) in the first canvas region, the projected image generation unit 22 calculates the position $(X_s, Y_s)$ that satisfies the above described expression (3). Here, the position $(X_s, Y_s)$ is a position in the coordinate system based on the sth captured image.

In a case where a pixel of the sth captured image is located in the calculated position $(X_s, Y_s)$, the projected image generation unit 22 sets the pixel value of the pixel as the pixel value of the pixel located in a position (Cx, Cy) in the first canvas region. In other words, if the pixel located in the position $(X_s, Y_s)$ in the captured image is a valid pixel, the pixel value of the pixel is written (mapped) in a position (Cx, Cy) in the first canvas region.

As pixels of the captured image are mapped in the respective positions (Cx, Cy) in the above manner, a projected image is generated in the first canvas region. Those processes in steps S41 and S42 are equivalent to the portion FC11 in the pseudo code shown in FIG. 25.

In step S43, the projected image generation unit 22 processes the projected image so that the ends of the sth projected image in the Cx-axis direction become parallel to the Cy-axis.

Specifically, in a case where a pixel row formed with pixels having the same Cy-coordinate in the first canvas includes one or more pixels to which no pixel values have been assigned in the process in step S42, the projected image generation unit 22 invalidates the pixel values of the pixels in the pixel row.

Figure 28:
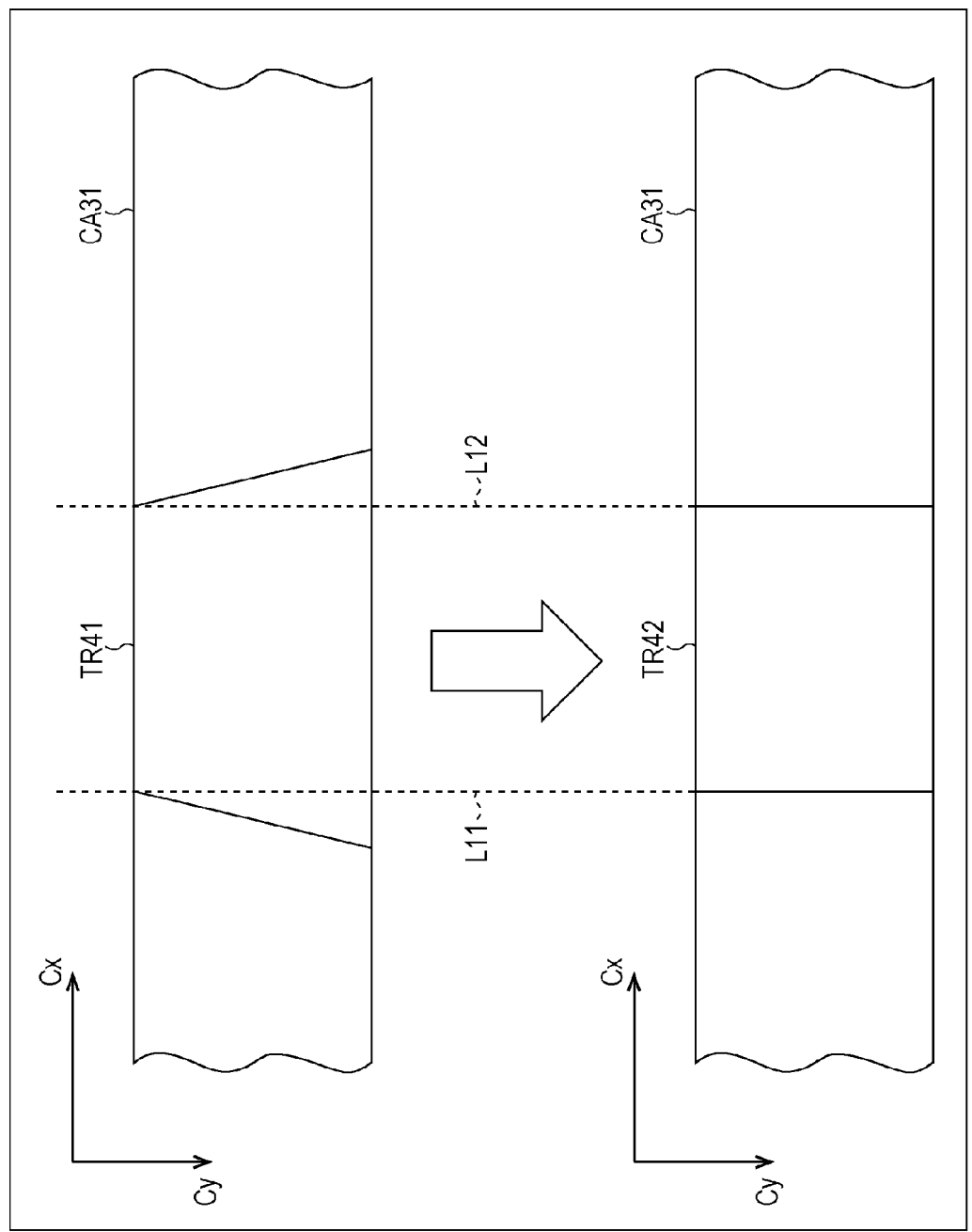
FIG. 28 is a diagram for explaining processing performed on a projected image.

For example, as shown in the upper half of FIG. 28, a first canvas region CA31 is secured, and an image TR41 is obtained by mapping a captured image on the first canvas region CA31. In FIG. 28, the horizontal direction and the vertical direction indicate the Cx-axis direction and the Cy-axis direction, respectively. A straight line L11 and a straight line L12 are straight lines parallel to the Cy-axis.

The right and left ends of the image TR41 obtained in the above manner are not necessarily parallel to the Cy-axis direction. In the example shown in FIG. 28, the right and left ends of the image TR41 are not parallel to the Cy-axis direction.

Since the image processing device 11 generates a panoramic image by using cumulative difference values, for example, the right and left ends of each projected image are preferably parallel to the Cy-axis. Therefore, the projected image generation unit 22 removes the portion on the left side of the straight line L11 in the image TR41 in the drawing and the portion on the right side of the straight line L12 in the image TR41 in the drawing. That is, the pixel values in those portions are invalidated. As a result, a rectangular projected image TR42 is obtained in the first canvas region CA31 as shown in the lower half of the drawing.

Such a process in step S43 is equivalent to the portion FC12 in the pseudo code shown in FIG. 25.

Referring back to the flowchart shown in FIG. 24, in step S44, the projected image generation unit 22 determines whether all the captured images have been processed. For example, when projected images corresponding to the N captured images have been generated, the projected image generation unit 22 determines that all the captured images have been processed.

If it is determined in step S44 that not all the captured images have been processed, the process returns to step S41, and the above described process is repeated. That is, an unprocessed captured image is projected on the first canvas region, to form a projected image.

If it is determined in step S44 that all the captured images have been processed, on the other hand, the projected image generation unit 22 in step S45 performs an offset process on the projected images.

For example, the projected image generation unit 22 determines an offset value so that the left end of the first projected image is moved to the position of the origin of the Cx-Cy coordinate system. That is, the distance from the origin of the Cx-Cy coordinate system to the left end of the first projected image is calculated. In other words, the distance from the end of the first canvas region in the +Cx-axis direction to the first pixel with an invalid pixel value located in the −Cx-axis direction in relation to the end of the first canvas region in the +Cx-axis direction is set as the offset value.

After determining the offset value, the projected image generation unit 22 secures a second canvas region in the Cx-Cy coordinate system for the sth projected image ($1 \leq s \leq N$).

Here, the width of the second canvas region in the Cx-axis direction and the width of the second canvas region in the Cy-axis direction is "width" and "height", respectively. That is, the second canvas region has the same size as the first canvas region. The second canvas region is located so that the center position of the second canvas position in the Cy-axis direction at the end of the second canvas region in the −Cx-axis direction is the origin of the Cx-Cy coordinate system.

The projected image generation unit 22 then writes the pixel value of the pixel located in a position (tmpCx, Cy) in the sth first canvas region into a position (Cx, Cy) in the sth second canvas region. That is, the pixel value of the pixel located in a position (tmpCx, Cy) in the first canvas region is set as the pixel value of the pixel located in a position (Cx, Cy) in the second canvas region. Where the offset value is represented by offsetCx, tmpCx is expressed as (Cx−offsetCx).

As writing is performed on the first through Nth second canvas regions, the image data in those second canvas regions form projected images. More specifically, the images formed with the valid pixels in the second canvas regions are projected images.

After each of the projected images is made to shift in the Cx-axis direction by the amount equivalent to the offset value in the above manner, the end of the first projected image is located in the position of the origin of the Cx-Cy coordinate system. The offset process performed in step S45 is equivalent to the pseudo code shown in FIG. 26.

The projected image generation unit 22 supplies the first through Nth projected images to the cumulative difference value calculation unit 23, the diagraph generation unit 24, and the panoramic image generation unit 26. After the projected images are generated, the mapping process comes to an end, and the process moves on to step S13 in FIG. 23.

Referring back to the flowchart shown in FIG. 23, in step S13, the cumulative difference value calculation unit 23 calculates cumulative difference values between the projected images based on the respective projected images supplied from the projected image generation unit 22, and supplies the cumulative difference values to the diagraph generation unit 24.

The cumulative difference value calculation unit 23 calculates cumulative difference values by executing the pseudo code shown in FIGS. 29 and 30, for example.

That is, the cumulative difference value calculation unit 23 sets the width ("width") at $2\pi F$, and calculates the width ("height") by multiplying the number of pixels in the captured image in the Cy-axis direction by 0.9.

Where $1 \leq s \leq N-1$, the cumulative difference value calculation unit 23 calculates a cumulative difference value Diff[s, s+1](Cx) between the sth projected image and the (s+1)th projected image.

Specifically, the cumulative difference value calculation unit 23 determines whether the following conditions are satisfied: a valid pixel exists in a position Cx, or in a position where the Cx-coordinate is a predetermined position Cx, in the sth projected image, and a valid pixel also exists in the position Cx in the (s+1)th projected image.

If such conditions are satisfied, the cumulative difference value calculation unit 23 calculates a difference (an absolute difference value) between the pixel value of the pixel in the position (Cx, Cy) in the sth projected image and the pixel value of the pixel in the position (Cx, Cy) in the (s+1)th projected image, for each of the values of Cy (−height/2 $\leq$ Cy $\leq$ height/2). The cumulative difference value calculation unit 23 calculates the total sum of the differences in pixel value calculated in the above manner with respect to the respective values of Cy, to determine the cumulative difference value Diff[s, s+1](Cx).

If the above conditions are not satisfied with respect to a predetermined position Cx, the cumulative difference value calculation unit 23 invalidates the cumulative difference value Diff[s, s+1](Cx) with respect to the predetermined position Cx.

In the above manner, the cumulative difference value calculation unit 23 calculates the cumulative difference values Diff[s, s+1](Cx) between successive projected images with respect to each position Cx in the range of 0≤Cx<width, for each value of s (1≤s≤N−1).

The cumulative difference value calculation unit 23 also determines a cumulative difference value Diff[N, N+1](Cx) between the Nth projected image and the (N+1)th projected image, with the first projected image being the (N+1)th projected image.

That is, the cumulative difference value calculation unit 23 determines whether the following conditions are satisfied: a valid pixel exists in a position Cx in the Nth projected image, and a valid pixel exists in the position Cx in the first or (N+1)th projected image. If the conditions are satisfied, the cumulative difference value calculation unit 23 calculates a difference (an absolute difference value) between the pixel value of the pixel in the position (Cx, Cy) in the Nth projected image and the pixel value of the pixel in the position (Cx, Cy) in the (N+1)th (first) projected image, for each value of Cy (−height/2≤Cy≤height/2). The cumulative difference value calculation unit 23 calculates the total sum of the differences in pixel value calculated in the above manner with respect to the respective values of Cy, to determine the cumulative difference value Diff[N, N+1](Cx).

If the above conditions are not satisfied with respect to a predetermined position Cx, the cumulative difference value calculation unit 23 invalidates the cumulative difference value Diff[N, N+1](Cx) with respect to the predetermined position Cx.

The cumulative difference value calculation unit 23 supplies the cumulative difference values Diff[s, s+1](Cx) calculated in the above manner, to the diagraph generation unit 24. Calculating the cumulative difference values in the above manner is equivalent to detecting a moving object from projected images by determining difference information between the projected images.

In step S14, the diagraph generation unit 24 generates a diagraph based on the projected images supplied from the projected image generation unit 22 and the cumulative difference values Diff[s, s+1](Cx) supplied from the cumulative difference value calculation unit 23, and supplies the diagraph to the path search unit 25.

By executing the pseudo code shown in FIGS. 31 through 33, for example, the diagraph generation unit 24 constructs a diagraph having energies assigned thereto based on the cumulative difference values.

Specifically, for each value of s (1≤s≤N), the diagraph generation unit 24 determines whether a valid pixel exists in a position Cx or in a position with a predetermined position Cx in the Cx-coordinate in the sth projected image, and a valid pixel also exists in the position Cx+1 in the sth projected image.

If there are valid pixels in the position Cx and the position Cx+1 in the sth projected image, the diagraph generation unit 24 sets 0 as the energy value for the arrow (edge) extending from the node in the position (Cx, s) to the node in the position (Cx+1, s) in the diagraph. The diagraph generation unit 24 performs this process for all the values of Cx that satisfy 0≤Cx<width−1. Here, the focal length of the captured image is represented by F, and "width" is 2πF.

If there is a valid pixel in the position Cx=width−1 in the sth projected image, and there is a valid pixel in the position Cx=0 in the sth projected image, the diagraph generation unit 24 sets 0 as the energy value for the edge from the node in the position (width−1, s) to the node in the position (0, s) in the diagraph.

Further, the diagraph generation unit 24 determines whether a valid pixel exists in a position Cx in the first ((N+1)th) projected image, and a valid pixel also exists in the position Cx+1 in the first projected image with respect to s=N+1. If there are valid pixels in the position Cx and the position Cx+1 in the first projected image, the diagraph generation unit 24 sets 0 as the energy value for the edge from the node in the position (Cx, N+1) to the node in the position (Cx+1, N+1) in the diagraph.

Through the above process, energies are assigned to the rightward arrows (edges) in the diagraph shown in FIG. 8. This process is equivalent to the pseudo code shown in FIGS. 31 and 32.

For each value of s (1≤s≤N), the diagraph generation unit 24 then determines whether the cumulative difference value Diff[s, s+1](Cx) is valid, and the cumulative difference value Diff[s, s+1](Cx+1) is also valid. If those cumulative difference values are valid, the diagraph generation unit 24 sets the mean value of the cumulative difference values Diff[s, s+1](Cx) and Diff[s, s+1](Cx+1) as the energy value for the edge from the node in the position (Cx, s) to the node in the position (Cx+1, s+1).

The diagraph generation unit 24 performs this process for all the values of Cx that satisfy 0≤Cx<width−1.

For each value of s (1≤s≤N), the diagraph generation unit 24 also determines whether the cumulative difference value Diff[s, s+1](width−1) is valid, and the cumulative difference value Diff[s, s+1](0) is also valid. If those cumulative difference values are valid, the diagraph generation unit 24 sets the mean value of the cumulative difference values Diff[s, s+1](width−1) and Diff[s, s+1](0) as the energy value for the edge from the node in the position (width−1, s) to the node in the position (0, s+1).

Through these processes, energies are assigned to the arrows (edges) extending downward to the right in the digraph shown in FIG. 8, and the diagraph is constructed. These processes are equivalent to the pseudo code shown in FIG. 33. In the diagraph generated by the diagraph generation unit 24, energies are assigned to the edges between the respective nodes, and those energies indicate the degrees of image defects that occur when projected images are joined at the positions of those nodes.

After the diagraph is constructed by assigning energies between the respective nodes in the above manner, the obtained diagraph is supplied to the path search unit 25, and the process moves on to step S15.

In step S15, the path search unit 25 searches for the path with the smallest total energy value (hereinafter also referred to as the minimum energy path) based on the diagraph supplied from the diagraph generation unit 24.

For example, the path search unit 25 searches for the minimum energy path by executing the pseudo code shown in FIG. 34.

Specifically, the path search unit 25 sets the largest value that can be handled by the image processing device 11 as the initial value of the minimum value "minTotal" among the total energy values of respective paths.

The path search unit 25 then selects an unprocessed position Cx from among the positions Cx that satisfy 0≤Cx<width−1. Here, "width" is 2πF.

In a case where an energy is assigned to the edge from the node in the position (Cx, 1) to the node in the position (Cx+1, 1) or where an energy is assigned to the edge from the node in the position (Cx, 1) to the node in the position (Cx+1, 2), the path search unit 25 performs the following process for the selected position Cx.

Specifically, the path search unit 25 calculates the path with the smallest total energy value among the paths extending from the position (Cx, 1) to the position (Cx, N+1) in the diagraph by dynamic programming. At this point, the total energy value calculation unit 31 calculates the total energy value of each path that is the total sum of the energies of the edges between the nodes existing in the path.

The obtained path that extends from the position (Cx, 1) to the position (Cx, N+1) and has the smallest total energy value is set as a path "path(Cx)". The total energy value of this path "path(Cx)" is represented by "total(Cx)".

After calculating the path "path(Cx)" and the total energy value "total(Cx)" with respect to the selected position Cx, the path search unit 25 updates the minimum energy path "minPath" and the total energy value of the minimum energy path "minPath" or the minimum value "minTotal" among the total energy values of the respective paths.

That is, if the total energy value "total(Cx)" of the current path "path(Cx)" is smaller than the minimum value "minTotal", or if total(Cx)<minTotal, the path search unit 25 sets the current path "path(Cx)" as the minimum energy path "minPath". The path search unit 25 also sets the total energy value "total(Cx)" of the path "path(Cx)" as the new minimum value "minTotal".

When total(Cx)≥minTotal, the minimum energy path "minPath" and the minimum value "minTotal" are not updated.

While sequentially selecting all the positions Cx that satisfy 0≤Cx<width−1, the path search unit 25 calculates the path "path(Cx)" and the total energy value "total(Cx)" with respect to each position Cx, and determines the eventual minimum energy path "minPath" by updating the minimum energy path "minPath" and the minimum value "minTotal". The minimum energy path "minPath" indicates such joining positions between the respective projected images as to minimize image defects in a panoramic image that is generated by using positions from a predetermined position in the first projected image as the reference to a predetermined position in the (N+1)th projected image.

The path search unit 25 supplies the eventually obtained minimum energy path "minPath" to the panoramic image generation unit 26, and the process moves from step S15 on to step S16.

In step S16, the panoramic image generation unit 26 generates a 360-degree panoramic image based on the minimum energy path "minPath" supplied from the path search unit 25 and the projected images supplied from the projected image generation unit 22, and then outputs the 360-degree panoramic image.

The panoramic image generation unit 26 generates a 360-degree panoramic image by executing the pseudo code shown in FIG. 35, for example.

Specifically, the panoramic image generation unit 26 secures a panoramic canvas region for a 360-degree panoramic image in the Cx-Cy coordinate system.

At this point, the panoramic canvas region is positioned so that the center position of the panoramic canvas region in the Cy-axis direction at the end of the panoramic canvas region in the −Cx-axis direction is the origin of the Cx-Cy coordinate system. The width ("width") of the panoramic canvas region in the Cx-axis direction is 2πF, and the vertical width ("height") of the panoramic canvas region in the Cy-axis direction has the value obtained by multiplying the number of pixels in the captured image in the Cy-axis direction by 0.9.

For a predetermined position Cx that satisfies 0≤Cx<width, the usage region determination unit 32 of the panoramic image generation unit 26 determines the "s" having the minimum energy path "minPath" extending through the node located in the position (Cx, s) in the diagraph, and sets the determined "s" as "appropriateS". That is, in the minimum energy path "minPath", the position (Cx, s) of the node in the selected predetermined position Cx in the Cx-coordinate is determined, and the "s" of the position (Cx, s) is determined to be "appropriateS".

As for the "s=appropriateS" determined in the above manner, the panoramic image generation unit 26 writes the pixel value of the pixel located in the position (Cx, Cy) (−height/2≤Cy≤height/2) in the (appropriateS)th projected image, into the position (Cx, Cy) in the panoramic canvas region. That is, the pixel value of the pixel in each position (Cx, Cy) that is a predetermined position Cx in the Cx-coordinate in the (appropriateS)th projected image is set as the pixel value of the pixel located in the position (Cx, Cy) in the panoramic canvas region.

By performing the above process for each position Cx that satisfies 0≤Cx<width, the panoramic image generation unit 26 writes a pixel value into each of the pixels in the panoramic canvas region, to form an eventual 360-degree panoramic image. That is, the image formed with the respective pixels written into the panoramic canvas region is a 360-degree panoramic image.

Here, for the usage region determination unit 32, determining the projected images to be used in generating a panoramic image with respect to the respective values of the Cx-coordinate based on the minimum energy path is equal to determining the boundary positions (joining positions) between the regions of the projected images to be used in generating a panoramic image based on the minimum energy path.

After generating a panoramic image, the panoramic image generation unit 26 outputs the generated panoramic image. The panoramic image generation process then comes to an end.

As described above, the image processing device 11 generates a diagraph based on the cumulative difference values obtained from projected images, and generates a 360-degree panoramic image by joining the respective projected images based on the path with the smallest total energy value in the obtained diagraph.

By using a diagraph in the above manner, joining positions between the projected images to be used in generating a panoramic image can be determined so as to minimize image defects, and a high-quality panoramic image with fewer defects can be obtained.

Although 0 is set as the energy for the edge extending from the node in the position (Cx, s) to the node in the position (Cx+1, s) at the time of generation of a diagraph in step S14, a predetermined positive value may be set as the energy for the end portions of valid projected images. In this manner, the path with the smallest total energy value detected by a search is likely to pass through the central portions of the projected images, and hardly passes through the end portions of the projected images.

As a result, more central portions of the projected images are used as the regions of the respective projected images to be used in a 360-degree panoramic image, and fewer end portions of the projected images are used. Normally, an imaging device such as a camera is designed to capture the central portion of each image clearly. Therefore, by performing the above described energy setting, more central portions that are the clear portions of the projected images are used in generating a panoramic image. As a result, a clearer panoramic image can be obtained.

Also, in the above description, the minimum energy path between the nodes in the diagraph corresponding to the respective positions in the first projected image and the nodes corresponding to the respective positions in the (N+1)th projected image is determined, with the first projected image being the reference. However, the reference image may not be the first projected image.

In a case where the second projected image is used as the reference or where the second projected image is regarded as the first projected image, for example, the first projected image is regarded as the Nth projected image, and the same image as the second projected image is regarded as the (N+1)th projected image that follows the first projected image. The minimum energy path between the nodes corresponding to the respective positions in the second projected image and the nodes corresponding to the respective positions in the (N+1)th projected image is determined, and a panoramic image is generated based on the minimum energy path.

<Second Embodiment>
[Example Structure of an Image Processing Device]

According to the method of generating a panoramic image by using a diagraph as described in the first embodiment (hereinafter also referred to as the diagraph method), the joints between the projected images to be used in generating a panoramic image can be determined while division of an image of each moving object is minimized. By the diagraph method, however, there are cases where an image of a moving object is divided, regardless of how the joints are determined.

To obtain a panoramic image with even higher quality, several panoramic images may be generated by capturing images of an object while the imaging device is being rotated 360 degrees or more, and the one with the fewest defects among those panoramic images may be selected as the eventual panoramic image.

Specifically, according to the diagraph method, for example, 10 captured images are taken while the imaging device is being rotated 36 degrees at a time. In this embodiment, however, extra image capturing is performed. That is, 12 captured images are taken while the imaging device is being rotated 36 degrees at a time, for example.

The first through tenth captured images are used to generate a 360-degree panoramic image according to the diagraph method. Likewise, the second through eleventh captured images are used to generate another 360-degree panoramic image according to the diagraph method, and the third through twelfth captured images are used to generate yet another 360-degree panoramic image according to the diagraph method.

After the three panoramic images are obtained in the above manner, the panoramic image with the highest quality or the panoramic image with the fewest defects caused by a moving object is output as the eventual panoramic image.

As the evaluation indicator of defects caused by a moving object in a panoramic image, the minimum value "minTotal", which is the total energy value of the minimum energy path "minPath" determined at the time of generation of the panoramic image, can be used, for example. This is because the minimum value "minTotal" indicates the degree of defects in an image of the moving object at the time of calculation of the path with the fewest defects in the image of the moving object.

Figure 36:
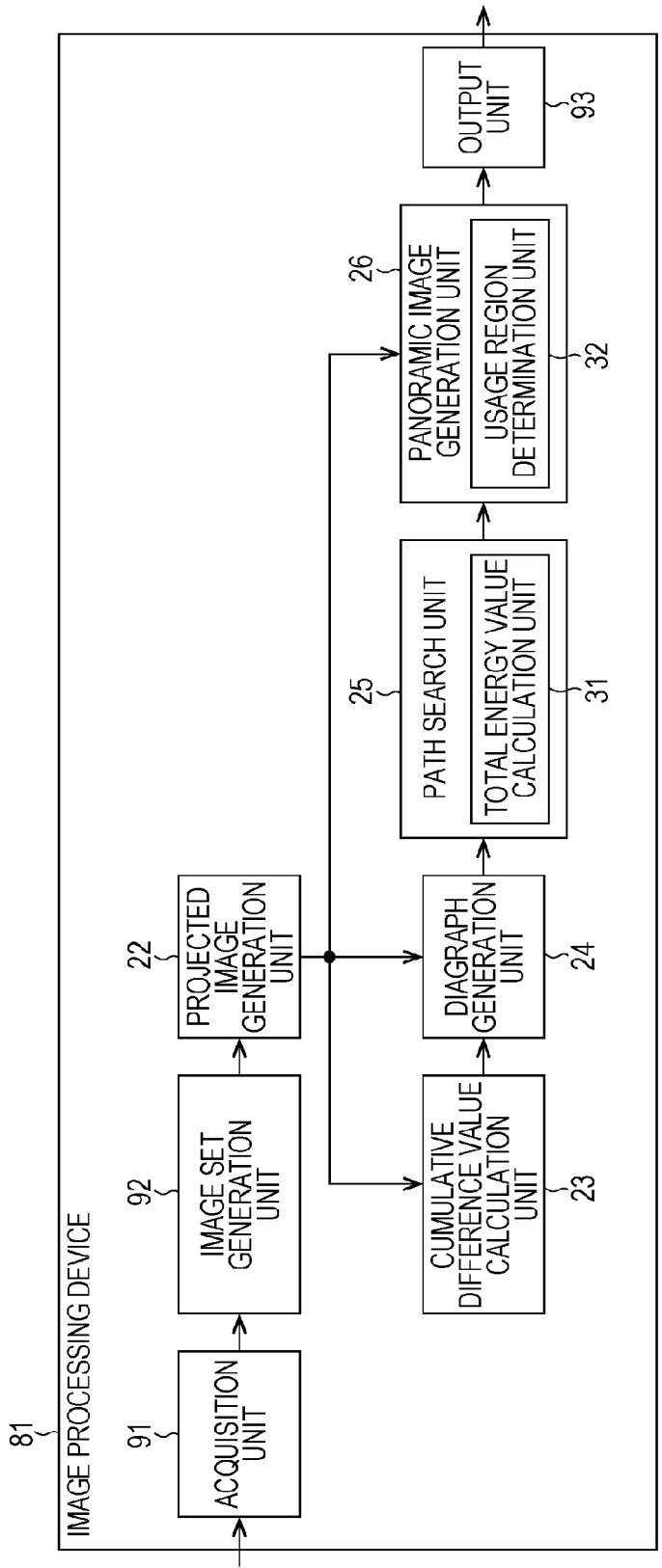
FIG. 36 is a diagram showing another example structure of an image processing device.

In a case where panoramic images are generated, and the one with the fewest defects among those panoramic images is output as an eventual panoramic image as described above, the image processing device has the structure shown in FIG. 36, for example.

The image processing device 81 shown in FIG. 36 includes an acquisition unit 91, an image set generation unit 92, a projected image generation unit 22, a cumulative difference value calculation unit 23, a diagraph generation unit 24, a path search unit 25, a panoramic image generation unit 26, and an output unit 93. In FIG. 36, the components equivalent to those shown in FIG. 22 are denoted by the same reference numerals as those used in FIG. 22, and explanation of them is not repeated herein.

The acquisition unit 91 acquires Mmax captured images that are successively captured by an imaging device, a homogeneous transformation matrix indicating the relationship between each captured image and the first captured image, and the focal length F of the captured images, and supplies the Mmax captured images, the homogeneous transformation matrix, and the focal length F to the image set generation unit 92. Here, the Mmax captured images acquired by the acquisition unit 91 are images that are successively taken by a user rotating the imaging device 360 degrees or more.

Based on the captured images, the homogeneous transformation matrix, and the focal length F supplied from the acquisition unit 91, the image set generation unit 92 determines a set of captured images of one round (360 degrees) required for generating one panoramic image.

Here, the set of captured images of one round (hereinafter also referred to as the image set) is a set of captured image that are obtained by the user taking images while rotating the imaging device 360 degrees. More specifically, the image set includes the homogeneous transformation matrix indicating the positional relationships between the captured images and the focal length F.

The image set generation unit 92 determines a few image sets, and supplies those image sets to the projected image generation unit 22.

For each of the image sets supplied from the image set generation unit 92, the projected image generation unit 22 generates projected images of the captured images included in the image set, and supplies the projected images to the cumulative difference value calculation unit 23, the diagraph generation unit 24, and the panoramic image generation unit 26.

For each of the image sets, the cumulative difference value calculation unit 23, the diagraph generation unit 24, the path search unit 25, and the panoramic image generation unit 26 perform calculation of cumulative difference values, generation of a diagraph, a search for the minimum energy path, and generation of a panoramic image. At this point, the path search unit 25 supplies the minimum energy path obtained by the search in each image set and the minimum value "minTotal" (the total energy value of the minimum energy path) to the panoramic image generation unit 26. For each of the image sets, the panoramic image generation unit 26 supplies a panoramic image and the minimum value "minTotal" of the panoramic image to the output unit 93.

Based on the minimum values "minTotal" supplied from the panoramic image generation unit 26, the output unit 93 selects the eventual panoramic image from among the panoramic images supplied from the panoramic image generation unit 26, and outputs the selected panoramic image.

[Image Set]

Where the homogeneous transformation matrix indicating the positional relationship with respect to the sth (1<s≤Mmax) captured image in a coordinate system based on the first captured image is represented by $H_{1,s}$, the relationship according to the following expression (4) is established.

[Mathematical Formula 4]

$$\begin{bmatrix} X_1 \\ Y_1 \\ F \end{bmatrix} \propto H_{1,s} \begin{bmatrix} X_s \\ Y_s \\ F \end{bmatrix} \equiv \begin{bmatrix} H_{1,s[1,1]} & H_{1,s[1,2]} & H_{1,s[1,3]} \\ H_{1,s[2,1]} & H_{1,s[2,2]} & H_{1,s[2,3]} \\ H_{1,s[3,1]} & H_{1,s[3,2]} & H_{1,s[3,1]} \end{bmatrix} \begin{bmatrix} X_s \\ Y_s \\ F \end{bmatrix} \quad (4)$$

In the expression (4), F represents the focal length of the captured images.

The homogeneous transformation matrix $H_{1,s}$ in the expression (4) is a 3-by-3 matrix formed with nine scalar quantities $H_{1,s[a,b]}$ (1≤a≤3, 1≤b≤3).

As is apparent from the meaning of the homogeneous transformation matrix $H_{1,s}$ the direction of the three-dimensional vector shown below in the expression (5) is the image capturing direction of the sth captured image in the coordinate system based on the first captured image. Here, the image capturing direction of the sth captured image is the direction from the origin of the coordinate system based on the first captured image toward the center of the sth captured image.

[Mathematical Formula 5]

$$\begin{bmatrix} H_{1,s[1,3]} \\ H_{1,s[2,3]} \\ H_{1,s[3,1]} \end{bmatrix} \quad (5)$$

Further, the value of the scalar quantity $H_{1,s[1,3]}$ is the $X_1$-coordinate of the image capturing direction of the sth captured image in the $X_1$-$Y_1$-$Z_1$ coordinate system based on the first captured image.

The scalar quantity $H_{1,s[1,3]}$ of each "s" is examined, and the value of "s" that satisfies the following expression (6) is calculated to determine M(1)=s.

[Mathematical Formula 6]

$$H_{1,s[1,3]} < 0 < H_{1,s+1[1,3]} \quad (6)$$

Here, M(t) indicates what number image the last captured image within a less-than-360-degree round is where the direction in which the tth captured image among the Mmax captured images is taken is the starting point or where the rotation angle of the imaging device is 0 degree.

Accordingly, in the example shown in the expression (6), the first through sth captured images, or a total of "s" captured images, are captured when image capturing is performed while the imaging device is rotated from 0 degree to 360 degrees (to be more specific, 360 degrees being excluded), with the image capturing direction of the first captured image being 0 degree.

In view of the above, to generate a 360-degree panoramic image based on the first captured image, an image set of the first through sth captured images, or a total of "s" captured images, should be prepared.

Where the homogeneous transformation matrix indicating the positional relationship with respect to the sth captured image in the $X_2$-$Y_2$-$Z_2$ coordinate system based on the second captured image is represented by $H_{2,s}$, this homogeneous transformation matrix $H_{2,s}$ can be determined by the calculation shown below in the expression (7). That is, the homogeneous transformation matrix $H_{2,s}$ is determined by the product of the inverse matrix of the homogeneous transformation matrix $H_{1,2}$ and the homogeneous transformation matrix $H_{1,s}$.

[Mathematical Formula 7]

$$H_{2,s} \equiv \begin{bmatrix} H_{2,s[1,1]} & H_{2,s[1,2]} & H_{2,s[1,3]} \\ H_{2,s[2,1]} & H_{2,s[2,2]} & H_{2,s[2,3]} \\ H_{2,s[3,1]} & H_{2,s[3,2]} & H_{2,s[3,1]} \end{bmatrix} \quad (7)$$

$$= H_{1,2}^{-1} H_{1,s}$$

Here, the value of the element $H_{2,s[1,3]}$ in the homogeneous transformation matrix $H_{2,s}$ is the $X_2$-coordinate of the image capturing direction of the sth captured image in the coordinate system based on the second captured image. In view of this, the value of $H_{2,s[1,3]}$ of each "s" is examined, and the value of "s" that satisfies the following expression (8) is calculated to determine M(2)=s.

[Mathematical Formula 8]

$$H_{2,s[1,3]} < 0 < H_{2,s+1[1,3]} \quad (8)$$

Further, where the homogeneous transformation matrix indicating the positional relationship with respect to the sth captured image in the $X_3$-$Y_3$-$Z_3$ coordinate system based on the third captured image is represented by $H_{3,s}$, this homogeneous transformation matrix $H_{3,s}$ can be determined by the calculation shown below in the expression (9).

[Mathematical Formula 9]

$$H_{3,s} \equiv \begin{bmatrix} H_{3,s[1,1]} & H_{3,s[1,2]} & H_{3,s[1,3]} \\ H_{3,s[2,1]} & H_{3,s[2,2]} & H_{3,s[2,3]} \\ H_{3,s[3,1]} & H_{3,s[3,2]} & H_{3,s[3,1]} \end{bmatrix} \quad (9)$$

$$= H_{1,3}^{-1} H_{1,s}$$

Here, the value of the element $H_{3,s[1,3]}$ in the homogeneous transformation matrix $H_{3,s}$ is the $X_3$-coordinate of the image capturing direction of the sth captured image in the coordinate system based on the third captured image. In view of this, the value of $H_{3,s[1,3]}$ of each "s" is examined, and the value of "s" that satisfies the following expression (10) is calculated to determine M(3)=s.

[Mathematical Formula 10]

$$H_{3,s[1,3]} < 0 < H_{3,s+1[1,3]} \quad (10)$$

Likewise, the respective values of M(k), such as M(4) and M(5), can be determined. For example, where the homogeneous transformation matrix indicating the positional relationship with respect to the sth captured image in the $X_t$-$Y_t$-$Z_t$ coordinate system based on the tth captured image is represented by $H_{t,s}$ this homogeneous transformation matrix $H_{t,s}$ can be determined by the calculation shown below in the expression (11). That is, the homogeneous transformation matrix $H_{t,s}$ is determined by the product of the inverse matrix of the homogeneous transformation matrix $H_{1,t}$ and the homogeneous transformation matrix $H_{1,s}$.

[Mathematical Formula 11]

$$H_{t,s} \equiv \begin{bmatrix} H_{t,s[1,1]} & H_{t,s[1,2]} & H_{t,s[1,3]} \\ H_{t,s[2,1]} & H_{t,s[2,2]} & H_{t,s[2,3]} \\ H_{t,s[3,1]} & H_{t,s[3,2]} & H_{t,s[3,1]} \end{bmatrix} \quad (11)$$
$$= H_{1,t}^{-1} H_{1,s}$$

Here, the value of the element $H_{t,\,s[1,\,3]}$ in the homogeneous transformation matrix $H_{t,\,s}$ is the $X_t$-coordinate of the image capturing direction of the sth captured image in the coordinate system based on the tth captured image. In view of this, the value of $H_{t,\,s[1,\,3]}$ of each "s" is examined, and the value of "s" that satisfies the following expression (12) is calculated to determine M(t)=s.

[Mathematical Formula 12]

$$H_{t,s[1,3]} < 0 < H_{t,s+1[1,3]} \quad (12)$$

Since the number of captured images is "Mmax", M(t) does not exist if "t" is too large. Therefore, an image set of one round should be generated only for each "t" with which the M(t)th captured image exists (is secured).

[Description of a Panoramic Image Generation Process]

Referring now to the flowchart shown in FIG. 37, a panoramic image generation process to be performed by the image processing device 81 is described.

Although an example case where images are captured while a user is rotating the imaging device rightward (clockwise) in relation to the user is described below, the same process as described below is performed in a case where images are captured while the imaging device is rotated leftward.

In step S91, the acquisition unit 91 acquires Mmax captured images, the homogeneous transformation matrix indicating the positional relationship between each captured image and the first captured image, and the information indicating the focal length F of each captured image, and supplies the captured images, the homogeneous transformation matrix, and the information to the image set generation unit 92.

In step S92, the image set generation unit 92 generates several image sets based on the captured images, the homogeneous transformation matrix, and the focal length F supplied from the acquisition unit 91, and supplies the image sets to the projected image generation unit 22.

Specifically, the image set generation unit 92 generates several image sets by executing the pseudo code shown in FIG. 38.

That is, the image set generation unit 92 selects a value of "t" as the value "t" (1≤t≤Mmax) indicating what number image the reference captured image is or how many images have been captured so far. For example, each of the numbers 1 through "Mmax" is sequentially selected as the value of "t".

The image set generation unit 92 then performs the calculation shown in the above expression (11), to calculate the homogeneous transformation matrix $H_{t,\,s}$ indicating the position of the sth captured image in the coordinate system based on the tth captured image.

The image set generation unit 92 also determines the value of "s" that satisfies the expression (12) in the element $H_{t,\,s[1,\,3]}$ of the calculated homogeneous transformation matrix $H_{t,\,s}$. By doing so, the image set generation unit 92 identifies the last M(t)th captured image to be used in generating a 360-degree panoramic image based on the tth captured image.

If there exists a value of "s" that satisfies the expression (12) at this point, the image set generation unit 92 generates an image set including the tth through sth (M(t)th) captured images, the homogeneous transformation matrix $H_{t,\,s}$, and the focal length F, as the image set for the 360-degree panoramic image based on the tth captured image.

The image set generation unit 92 then selects the next value of "t", and repeats the above described process. If no values of "s" satisfy the expression (12), any image set for a 360-degree panoramic image based on the tth or later captured image is not obtained. Therefore, the image set generation unit 92 ends the process of generating image sets.

After generating image sets in the above manner, the image set generation unit 92 supplies the generated image sets to the projected image generation unit 22. The process then moves on to step S93. It is assumed that a total of T image sets ranging from the image set based on the first captured image to the image set based on the Tth captured image are obtained in the process in step S92, and the description below is based on this assumption. Here, T represents "Tmax" in the pseudo code shown in FIG. 38.

After the process in step S92 is performed, the processes in steps S93 through S97 are performed. However, those processes are the same as the processes in steps S12 through S16 in FIG. 23, and therefore, explanation of them is not repeated herein.

It should be noted that, in steps S93 through S97, the processes are performed for each of the T image sets, and T 360-degree panoramic images corresponding to the T image sets are generated.

For example, when projected images with respect to the tth (1≤t≤T) image set are generated, the Cx-Cy coordinate system is defined in the coordinate system based on the tth captured image on the cylindrical surface. That is, the process of mapping the respective captured images on the cylindrical surface is performed by using the homogeneous transformation matrix $H_{t,\,s}$ and the focal length F included in the image set, and projected images are generated.

After generating the T panoramic images, the panoramic image generation unit 26 supplies the minimum values "minTotal" calculated at the time of generation of those panoramic images, and the panoramic images to the output unit 93.

In step S98, the output unit 93 selects the eventual panoramic image from among the panoramic images supplied from the panoramic image generation unit 26 based on the minimum values "minTotal" supplied from the panoramic image generation unit 26.

The minimum value "minTotal" calculated with respect to each panoramic image is the smallest value among the total energy values of the respective paths in the diagraph constructed from the projected images used in generating the panoramic image. That is, the minimum value "minTotal" is the total energy value of the minimum energy path, and indicates the degree of defects in the panoramic image due to a moving object or the like. Therefore, the panoramic image having the smallest minimum value "minTotal" is the highest-quality panoramic image with few defects.

In view of this, the output unit 93 selects the panoramic image with the smallest minimum value "minTotal" from among the T panoramic images, and outputs the selected panoramic image as the eventual 360-degree panoramic image. After the panoramic image is output, the panoramic image generation process comes to an end.

In the above described manner, the image processing device 81 generates image sets necessary for generating 360-degree panoramic images from captured images that are taken by the image device being rotationally moved 360 degrees or more, and generates panoramic images for the respective image sets. The image processing device 81 then selects the highest-quality panoramic image from among the obtained panoramic images, and outputs the highest-quality panoramic image as the eventual panoramic image.

As panoramic images are generated while the position of the imaging device serving as the reference (the starting point) used in generating the panoramic images is being varied as described above, a panoramic image with even higher quality can be obtained.

The series of processes described above can be performed either by hardware or by software. In a case where the series of processes are performed by software, the program forming the software is installed into a computer. The computer may be a computer incorporated in special-purpose hardware, or may be a general-purpose personal computer that can execute various kinds of functions by installing various kinds of programs, for example.

Figure 39:
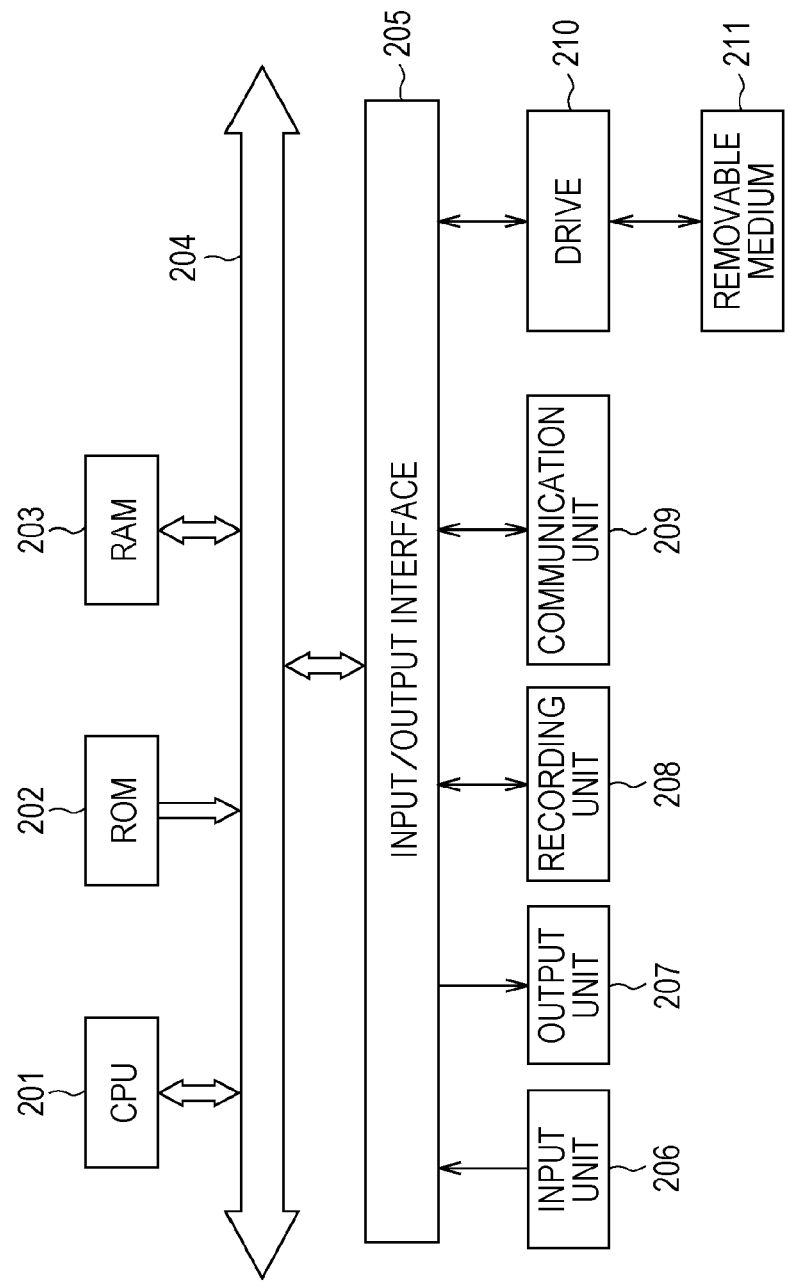
FIG. 39 is a diagram showing an example configuration of a computer.

FIG. 39 is a block diagram showing an example structure of the hardware of a computer that performs the above described series of processes in accordance with a program.

In the computer, a CPU (Central Processing Unit) 201, a ROM (Read Only Memory) 202, and a RAM (Random Access Memory) 203 are connected to one another by a bus 204.

An input/output interface 205 is further connected to the bus 204. An input unit 206, an output unit 207, a recording unit 208, a communication unit 209, and a drive 210 are connected to the input/output interface 205.

The input unit 206 is formed with a keyboard, a mouse, a microphone, and the like. The output unit 207 is formed with a display, a speaker, and the like. The recording unit 208 is formed with a hard disk, a nonvolatile memory, or the like. The communication unit 209 is formed with a network interface or the like. The drive 210 drives a removable medium 211 such as a magnetic disk, an optical disk, a magnetooptical disk, or a semiconductor memory.

In the computer having the above described structure, the CPU 201 loads a program stored in the recording unit 208 into the RAM 203 via the input/output interface 205 and the bus 204, and executes the program, so that the above described series of processes are performed.

The programs to be executed by the computer (the CPU 201) can be recorded on the removable medium 211 that is a packaged medium, for example, and be provided via the removable medium 211. Alternatively, the programs can be provided via a wired or wireless transmission medium such as a local area network, the Internet, or digital satellite broadcasting.

In the computer, the programs can be installed into the recording unit 208 via the input/output interface 205 when the removable medium 211 is mounted in the drive 210. Also, the programs may be received by the communication unit 209 via a wired or wireless transmission medium, and be installed into the recording unit 208. Alternatively, the programs may be installed beforehand into the ROM 202 or the recording unit 208.

The programs to be executed by the computer may be programs for performing operations in chronological order in accordance with the sequence described in this specification, or may be programs for performing operations in parallel or performing an operation when necessary, such as when there is a call.

It should be noted that embodiments of the present technique are not limited to the above described embodiments, and various modifications may be made to them without departing from the scope of the present technique.

For example, the present technique can be embodied in a cloud computing structure in which one function is shared among apparatuses via a network, and processing is performed by the apparatuses cooperating with one another.

The respective steps described with reference to the above described flowcharts can be carried out by one apparatus or can be shared among apparatuses.

Further, in a case where more than one process is included in one step, the processes included in the step can be performed by one apparatus or can be shared among apparatuses.

The present technique can also be in the following forms.

[1]

An image processing device that generates a 360-degree panoramic image by joining a plurality of captured images that are successively taken by an imaging device being rotated, the image processing device including:

a difference calculation unit configured to calculate difference information between the captured images adjacent to each other;

a data generation unit configured to generate data based on the difference information, the data indicating a degree of an image defect that occurs when the captured images adjacent to each other are joined in a predetermined position;

a determination unit configured to determine a joining position between the captured images based on the data, the joining position minimizing the degree of the image defect when the panoramic image is generated by using portions between a specific position in a reference one of the captured images and the specific position in the (N+1)th one of the captured images, the same image as the reference captured image being set as the (N+1)th captured image that follows the Nth one of the captured images, N being a number counted from the reference captured image; and an image generation unit configured to generate the panoramic image by joining the captured images based on the determined joining position.

[2]

The image processing device of [1], wherein the determination unit determines that the joining position having the smallest degree of the defect in the panoramic image is the eventual joining position among joining positions determined with respect to different specific positions.

[3]

The image processing device of [1] or [2], wherein the data is a diagraph in which the degree of the image defect that occurs when the captured images adjacent to each other are joined in the predetermined position is shown as the energy of an edge of a node corresponding to the predetermined position in the captured images.

[4]

The image processing device of [3], wherein the data generation unit calculates the image defect degree that is the mean value of the difference information in the predetermined position between the first one of the captured images and the second one of the captured images adjacent to each other, and the difference information in another position adjacent to the predetermined position in the first captured image and the second captured image, and sets the mean value as the energy of the edge between the node corresponding to the predetermined position in the first captured image and the node corresponding to the another position in the second captured image.

[5]

The image processing device of [4], wherein the determination unit determines the joining position between the captured images by identifying the path having the smallest total energy value of the edges between the nodes existing therein among the paths extending from the node corresponding to the specific position in the reference captured image to the node corresponding to the specific position in the (N+1)th captured image in the diagraph.

[6]

The image processing device of any of [1] through [5], wherein the image generation unit generates panoramic images by using different ones of the captured images as the reference captured images, and the image processing device further includes an output unit configured to output an eventual panoramic image, the eventual panoramic image being the panoramic image having the smallest image defect degree among the panoramic images.

REFERENCE SIGNS LIST

11 Image processing device
21 Acquisition unit
22 Projected image generation unit
23 Cumulative difference value calculation unit
24 Diagraph generation unit
25 Path search unit
26 Panoramic image generation unit
31 Total energy value calculation unit
32 Usage region determination unit
81 Image processing device
91 Acquisition unit
92 Image set generation unit
93 Output unit

The invention claimed is:

1. An image processing device, comprising:
a memory configured to store instructions; and
a central processing unit (CPU) configured to execute the instructions stored in the memory, wherein the CPU is configured to:
calculate difference information between a plurality of captured images that are successively taken by an imaging device in rotation and are projected adjacent to each other on a surface as a plurality of projected images, wherein the difference information is calculated based on an absolute value of difference between pixel values of pixels of the plurality of projected images;
generate a difference image based on the calculated difference information;
generate data based on the generated difference image, wherein the data indicates a degree of an image defect, that occurs in the plurality of captured images based on a determination that adjacent captured images of the plurality of captured images are joined in a determined position, wherein the data includes a first pixel value for each of the pixels in the generated difference image;
determine a first joining position of a plurality of joining positions between the adjacent captured images based on the generated data, wherein the determined first joining position minimizes the degree of the image defect based on a panoramic image generated based on portions between a specific position in a reference captured image of the plurality of captured images and the specific position in an Nth captured image of the plurality of captured images;
wherein the reference captured image is used to set an (N+1)th captured image, wherein the (N+1)th captured image follows the Nth captured image of the plurality of captured images, where in N is a number counted from the reference captured image; and
join the captured images based on the determined joining position to generate the panoramic image.

2. The image processing device according to claim 1, wherein the CPU is further configured to determine that a second joining position with a smallest degree of the image defect in the panoramic image is an eventual joining position among the plurality of joining positions determined with respect to different specific positions.

3. The image processing device according to claim 2, wherein the data is a diagraph in which the degree of the image defect, that occurs based on the determination that the adjacent captured images are joined at the determined position, is shown as energy of a first edge of a first node that corresponds to the determined position in the adjacent captured images.

4. The image processing device according to claim 3, wherein the CPU is further configured to:
calculate the degree of the image defect that is a mean value of the difference information in the determined position between a first captured image of the plurality of captured images and a second captured image of the plurality of captured images adjacent to each other, and the difference information in a different position adjacent to the determined position in the first captured image and the second captured image; and
set the mean value as the energy of the first edge between a second node that corresponds to the determined position in the first captured image and a third node that corresponds to the different position adjacent to the determined position in the second captured image.

5. The image processing device according to claim 4, wherein the CPU is further configured to determine the first joining position between the adjacent captured images of the plurality of captured images based on an identification of a first path with smallest total energy value of corresponding edges between a plurality of nodes which exist therein among paths which extend from a fourth node that corresponds to the specific position in the reference captured image to a fifth node that corresponds to the specific position in the (N+1)th captured image in the diagraph.

6. The image processing device according to claim 5, wherein the CPU is further configured to:
generate a plurality of panoramic images based on different captured images of the plurality of captured images as reference captured images; and
output an eventual panoramic image, wherein the eventual panoramic image is the panoramic image with the smallest degree of the image defect among the generated plurality of panoramic images.

7. An image processing method, comprising:
calculating difference information between a plurality of captured images that are successively taken by an imaging device being rotated and are projected adjacent to each other on a surface as a plurality of projected images, wherein the difference information is calculated based on an absolute value of difference between pixel values of pixels of the plurality of projected images;

generating a difference image based on the calculated difference information;

generating data based on the generated difference image, the data indicating a degree of an image defect that occurs in the plurality of captured images based on a determination that adjacent captured images of the plurality of captured images are joined at a determined position, wherein the data includes a first pixel value for each of the pixels in the generated difference image;

determining a first joining position of a plurality of joining position between the adjacent captured images based on the generated data, wherein the determined first joining position minimizing the degree of the image defect based on a panoramic image that is generated based on portions between a specific position in a reference captured image of the plurality of captured images and the specific position in an Nth captured image of the plurality of captured images;

wherein the reference captured image is used to set an (N+1)th captured image, wherein the (N+1)th captured image follows the Nth captured image of the plurality of captured images, where in N is a number counted from the reference captured image; and generating the panoramic image by joining the plurality of captured images based on the determined joining position.

8. A non-transitory computer-readable medium having stored thereon, computer-executable instructions for causing a computer to execute operations, the operations comprising:

calculating difference information between a plurality of captured images that are successively taken by an imaging device being rotated and are projected adjacent to each other on a surface as a plurality of projected images, wherein the difference information is calculated based on an absolute value of difference between pixel values of pixels of the plurality of projected images;

generating a difference image based on the calculated difference information;

generating data based on the generated difference image, the data indicating a degree of an image defect that occurs in the plurality of captured images based on a determination that adjacent captured images of the plurality of captured images are joined at a determined position, wherein the data includes a first pixel value for each of the pixels in the generated difference image;

determining a first joining position of a plurality of joining positions between the captured images based on the generated data, wherein the determined first joining position minimizes the degree of the image defect based on a panoramic image generated based on portions between a specific position in a reference captured image of the plurality of captured images and the specific position in an Nth captured image of the plurality of captured images;

wherein the reference captured image is used to set an (N+1)th captured image, wherein the (N+1)th captured image follows the Nth captured image of the plurality of captured images, where in N is a number counted from the reference captured image; and generating the panoramic image by joining the plurality of captured images based on the determined joining position.

\* \* \* \* \*